US 11,068,131 B1

United States Patent
Atallah et al.

(10) Patent No.: US 11,068,131 B1
(45) Date of Patent: Jul. 20, 2021

(54) INTEGRATED DRILL DOWN WITHIN A NATURAL LANGUAGE INTERFACE FOR A DATA ANALYSIS PLATFORM

(71) Applicant: Tableau Software, LLC, Seattle, WA (US)

(72) Inventors: Ryan Andrew Atallah, Palo Alto, CA (US); Jeffrey Ericson, Menlo Park, CA (US); Theodore Kornish, Palo Alto, CA (US)

(73) Assignee: TABLEAU SOFTWARE, LLC, Seattle, WA (US)

(*) Notice: Subject to any disclaimer, the term of this patent is extended or adjusted under 35 U.S.C. 154(b) by 0 days.

(21) Appl. No.: 16/858,466

(22) Filed: Apr. 24, 2020

(51) Int. Cl.
*G06F 3/0482* (2013.01)
*G06F 16/21* (2019.01)
*G06F 16/26* (2019.01)
*G06F 16/25* (2019.01)

(52) U.S. Cl.
CPC .......... *G06F 3/0482* (2013.01); *G06F 16/212* (2019.01); *G06F 16/252* (2019.01); *G06F 16/26* (2019.01)

(58) Field of Classification Search
CPC ...... G06F 3/0482; G06F 16/26; G06F 16/212; G06F 16/252
USPC .......................................................... 715/808
See application file for complete search history.

(56) References Cited

U.S. PATENT DOCUMENTS

| | | | | |
|---|---|---|---|---|
| 8,656,291 | B2* | 2/2014 | Chasman | G06F 3/0486 |
| | | | | 715/763 |
| 9,491,059 | B2* | 11/2016 | Fletcher | H04L 29/08072 |
| 9,710,527 | B1* | 7/2017 | Sherman | G06F 16/248 |
| 9,779,147 | B1* | 10/2017 | Sherman | G06F 16/248 |
| 9,985,863 | B2* | 5/2018 | Fletcher | G06F 3/04842 |
| 10,193,775 | B2* | 1/2019 | Fletcher | G06F 3/04817 |
| 10,209,956 | B2* | 2/2019 | Fletcher | H04L 41/069 |
| 10,416,841 | B2* | 9/2019 | Riche | G06F 16/4393 |
| 10,447,555 | B2* | 10/2019 | Fletcher | G06Q 10/06393 |
| 10,505,825 | B1* | 12/2019 | Bettaiah | H04L 43/045 |
| 10,521,077 | B1* | 12/2019 | Beran | G06F 3/04842 |
| 10,536,353 | B2* | 1/2020 | Gupta | G06F 3/0482 |
| 10,685,743 | B2* | 6/2020 | Ginsburg | G16H 40/20 |
| 10,732,810 | B1* | 8/2020 | Cohen | G06F 16/901 |
| 10,755,233 | B2* | 8/2020 | Powers | G06F 3/04847 |
| 10,902,045 | B2* | 1/2021 | Ericson | G06F 16/335 |
| 2017/0046374 | A1* | 2/2017 | Fletcher | G06F 3/0482 |
| 2017/0116373 | A1* | 4/2017 | Ginsburg | G16H 40/20 |
| 2018/0129369 | A1* | 5/2018 | Kim | G06F 16/254 |

(Continued)

*Primary Examiner* — William D Titcomb
(74) *Attorney, Agent, or Firm* — Morgan, Lewis & Bockius LLP

(57) ABSTRACT

A computing device displays a first data visualization based on a dataset retrieved from a database. The dataset includes a first data field. The first data visualization includes a first plurality of data marks. The device receives user selection of a first data mark that corresponds to a first data value of the first data field. In response to the user selection, the device displays a first data widget that includes one or more user-selectable affordances. A user selects a first user-selectable affordance. In response to the user selection, the device displays a first drill down widget. User input in the first drill down widget selects a second data field from the dataset. In response to the user input, the device generates a second data visualization that includes a second plurality of data marks and displays the second data visualization.

20 Claims, 32 Drawing Sheets

(56) References Cited

U.S. PATENT DOCUMENTS

2020/0089700 A1\* 3/2020 Ericson .............. G06F 16/904
2020/0089760 A1\* 3/2020 Ericson .............. G06F 3/0482

\* cited by examiner

| Order No. | Date | Customer Name | Address | State | Item Description | Part Number | Category | Sub-Category | Unit Price | Quantity | Sales |
|---|---|---|---|---|---|---|---|---|---|---|---|
| 1 | 2/13/2020 | Joe Smith | 123 Vineyard Road, San Francisco, CA 94110 | CA | Letter-sized envelopes | Smard-25 | Office Supplies | Envelopes | $9.90 | 10 | $99 |
| 2 | 2/13/2020 | Iris Lin | 255D 255 Jefferson St, Jefferson City, MO 65101 | MO | Armchair | Treetops 1100-Blue | Furniture | Chair | $240 | 2 | $480 |
| 3 | 2/13/2020 | Jack Roberts | 980 Stanley Ave, Brooklyn, NY 11208 | NY | Bookcase, 5-shelf | B12790 | Furniture | Bookcase | $219 | 2 | $438 |
| 4 | 2/14/2020 | Wonderful Enterprise Inc. | 1811 Monterey St, Bethlehem, PA 18017 | PA | Binder, 3 inch | GL13150-3 | Office Supplies | Binder | $5.99 | 100 | $599 |
| 5 | 2/14/2020 | Jane Knight | 811 Richard Ave, Santa Clara, CA 95050 | CA | Binder clips, assorted | 99914 | Office Supplies | Fasteners | $5.90 | 10 | $59 |
| 6 | 2/16/2020 | Robert Jackson | 176 Arnold Drive, Sonoma, CA 95476 | CA | Dining table set | Ashcroft D25-31 | Furniture | Table | $799 | 1 | $799 |
| 7 | 2/18/2020 | Absolute Restaurant Inc. | 1800 SW Johnson St, Aloha, OR 97006 | OR | Large brown envelopes | R3129S | Office Supplies | Envelopes | $19 | 10 | $190 |
| 8 | 2/18/2020 | MLK Elementary School | 1967 Peak Street, Morgan Hill, CA | CA | Children's art set | Art123 | Office Supplies | Art | $20 | 15 | $300 |
| 9 | 2/18/2020 | Jeff Chen | 80 Greenleaf St, Dallas, TX 75212 | TX | Binder, 2 inch | GL13150-2 | Office Supplies | Binder | $4.50 | 20 | $90 |
| 10 | 2/18/2020 | Jamie Argo | 3351 Oak Road, Eugene, OR 97401 | OR | Raised garden | Sol331 | Garden and Nursery | Garden | $119 | 2 | $238 |
| 11 | 2/18/2020 | Ginny Gin | 80 Burger St, Dallas, TX 75212 | TX | Tablet | XYZ-1 | Technology | Computer and Tablet | $499 | 1 | $499 |
| 12 | 2/18/2020 | Joel Johnson | 1241 Ridge St, Centre Hall, PA 16828 | PA | Copier Paper, ream | P123-L-BOX | Office Supplies | Paper | $60/box | 10 | $600 |
| ... | | | | | | | | | | | |

Figure 3

INTEGRATED DRILL DOWN WITHIN A NATURAL LANGUAGE INTERFACE FOR A DATA ANALYSIS PLATFORM

RELATED APPLICATIONS

This application is related to the following applications, each of which is incorporated by reference herein in its entirety:
(i) U.S. patent application Ser. No. 15/486,265, filed Apr. 12, 2017, entitled "Systems and Methods of Using Natural Language Processing for Visual Analysis of a Data Set," now U.S. Pat. No. 10,515,121;
(ii) U.S. patent application Ser. No. 15/804,991, filed Nov. 6, 2017, entitled "Systems and Methods of Using Natural Language Processing for Visual Analysis of a Data Set";
(iii) U.S. patent application Ser. No. 15/978,062, filed May 11, 2018, entitled "Applying Natural Language Pragmatics in a Data Visualization User Interface";
(iv) U.S. patent application Ser. No. 15/978,066, filed May 11, 2018, entitled "Data Visualization User Interface Using Cohesion of Sequential Natural Language Commands";
(v) U.S. patent application Ser. No. 15/978,067, filed May 11, 2018, entitled "Updating Displayed Data Visualizations According to Identified Conversation Centers in Natural Language Commands";
(vi) U.S. patent application Ser. No. 16/219,406, filed Dec. 13, 2018, entitled "Identifying Intent in Visual Analytical Conversations";
(vii) U.S. patent application Ser. No. 16/134,892, filed Sep. 18, 2018, entitled "Analyzing Natural Language Expressions in a Data Visualization User Interface";
(viii) U.S. patent application Ser. No. 16/134,907, filed Sep. 18, 2018, entitled "Natural Language Interface for Building Data Visualizations, Including Cascading Edits to Filter Expressions";
(ix) U.S. patent application Ser. No. 16/166,125, filed Oct. 21, 2018, entitled "Determining Levels of Detail for Data Visualizations Using Natural Language Constructs";
(x) U.S. patent application Ser. No. 16/234,470, filed Dec. 27, 2018, entitled "Analyzing Underspecified Natural Language Utterances in a Data Visualization User Interface";
(xi) U.S. patent application Ser. No. 16/601,437, filed Oct. 14, 2019, titled "Incremental Updates to Natural Language Expressions in a Data Visualization User Interface";
(xii) U.S. patent application Ser. No. 16/680,431, filed Nov. 11, 2019, entitled "Using Refinement Widgets for Data Fields Referenced by Natural Language Expressions in a Data Visualization User Interface"; and
(xiii) U.S. patent application Ser. No. 14/801,750, filed Jul. 16, 2015, entitled "Systems and Methods for using Multiple Aggregation Levels in a Single Data Visualization."

TECHNICAL FIELD

The disclosed implementations relate generally to data visualization and more specifically to systems, methods, and user interfaces that enable users to interact with data visualizations and analyze data using natural language expressions.

BACKGROUND

Data visualization applications enable a user to understand a data set visually. Visual analyses of data sets, including distribution, trends, outliers, and other factors are important to making business decisions. Some data sets are very large or complex, and include many data fields. Various tools can be used to help understand and analyze the data, including dashboards that have multiple data visualizations and natural language interfaces that help with visual analytical tasks.

SUMMARY

The use of natural language expressions to generate data visualizations provides a user with greater accessibility to data visualization features, including updating the fields and changing how the data is filtered. A natural language interface enables a user to develop valuable data visualizations with little or no training.

There is a need for improved systems and methods that support and refine natural language interactions with visual analytical systems. The present disclosure describes data visualization applications that provide more efficient methods and interfaces for manipulating and generating graphical views of data using natural language inputs. Such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

In some implementation, a method is performed at a computing device. The computing device has a display, one or more processors, and memory. The memory stores one or more programs configured for execution by the one or more processors. The method includes displaying a first data visualization, in a graphical user interface, based on a dataset retrieved from a database. The dataset includes a first data field having a first plurality of distinct data values. The first data visualization includes a first plurality of data marks. Each of the data marks in the first plurality corresponds to a respective distinct data value of the first data field. The method includes receiving user selection of a first data mark in the first data visualization. The first data mark corresponds to a first data value. In response to the user selection of the first data mark, the computing device displays a first data widget. The first data widget includes one or more user-selectable affordances. The computing device receives user selection of a first user-selectable affordance of the one or more user-selectable affordances. In response to the user selection of the first user-selectable affordance, the computing device displays a first drill down widget. The computing device receives a user input in the first drill down widget to select a second data field from the dataset. The second data field has a second plurality of distinct data values. In response to the user input in the first drill down widget, the computing device generates a second data visualization. The second data visualization includes a second plurality of data marks. Each of the data marks in the second plurality corresponds to a respective distinct data value of the second data field. The computing device displays the second data visualization.

When a user performs a "drill-down" operation (e.g., by selecting a second data field from the dataset), the computing device takes several actions: (i) add a filter expression to keep only records referenced by the selected mark; (ii) remove existing groupings (e.g. see the transition from "by Category" in FIG. 4H to "by Sub-Category" in FIG. 4I); (iii) if a new dimension is selected, add the dimension as a grouping (replacing the grouping that was just removed); and (iv) if a new measure is selected, replace the existing aggregations with a new aggregation.

In some instances, the dataset includes a plurality of data rows. Generating the second data visualization includes filtering the data rows to a subset of rows whose data value for the first data field match the first data value.

In some instances, generating the second data visualization includes grouping data rows in the subset according to data values of the second data field.

In some instances, the first data field and the second data field are hierarchically related.

In some instances, the first data field and the second data field are not hierarchically related.

In some implementations, the method further comprises displaying in the graphical user interface a plurality of phrases that define the second data visualization.

In some implementations, the plurality of phrases are in a natural language command box.

In some implementations, the method further comprises receiving user selection of a second data mark in the second data visualization. The second data mark corresponds to a second data value of the second data field. In response to the user selection of the second data mark, the computing device displays a second data widget that includes the one or more user-selectable affordances. The second data widget is distinct from the first data widget. The computing device receives user selection of the first user-selectable affordances in the second data widget. In response to the user selection of the first user-selectable affordances in the second data widget, the computing device displays a second drill down widget. The computing device receives user input in the second drill down widget to select a third data field from the dataset. In response to the user input in the second drill down widget, the computing device generates a third data visualization that includes a third plurality of data marks. Each of the data marks in the third plurality corresponds to a distinct data value of the third data field. The computing device further displays the third data visualization.

In some instances, generating the third data visualization includes filtering data rows of the dataset to a second subset of rows whose data value for the first data field match the first data value and whose data value for the second data field match the second data value. The computing device groups data rows of the second subset according to the data values of the third data field.

In some instances, the method further comprises displaying, in the second drill down widget, a label that includes the first data value and the second data value.

In some instances, the method comprises displaying, in the second drill down widget, a plurality of aggregation operators. The computing device receives user selection of a first aggregation operator in the second drill down widget. Generating the third data visualization includes aggregating values of the third data field using the first aggregation operator.

In some instances, the first data visualization is a bar chart. The first data mark is a bar of the bar chart.

In some instances, the first data visualization and the second data visualization have a common data visualization type.

In some instances, the first data visualization and the second data visualization have distinct data visualization types.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIG. 3 illustrates an exemplary data source (or dataset) according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices disclosed in the present specification improve upon data visualization methods by performing drill down operations that update an existing data visualization. The drill down operations focus on aspects of an existing data visualization and create modified data visualizations that include a particular focus. Some methods and devices disclosed in the present specification also improve upon data visualization methods by automatically updating natural language inputs used to generate data visualizations. Such methods and devices improve user interaction with the natural language interface by providing quicker and easier incremental updates to natural language expressions related to a data visualization.

Figure 1:
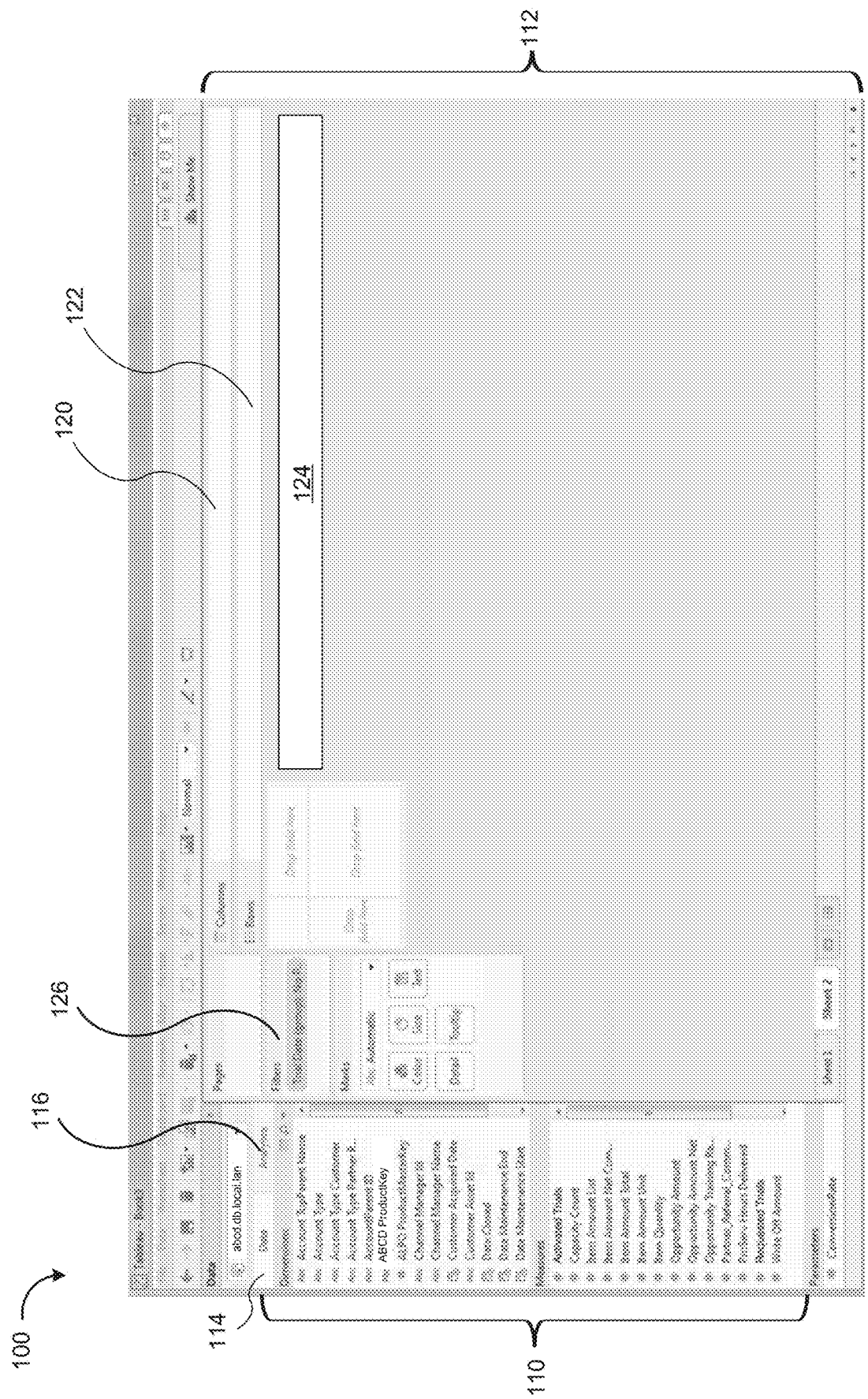
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2:
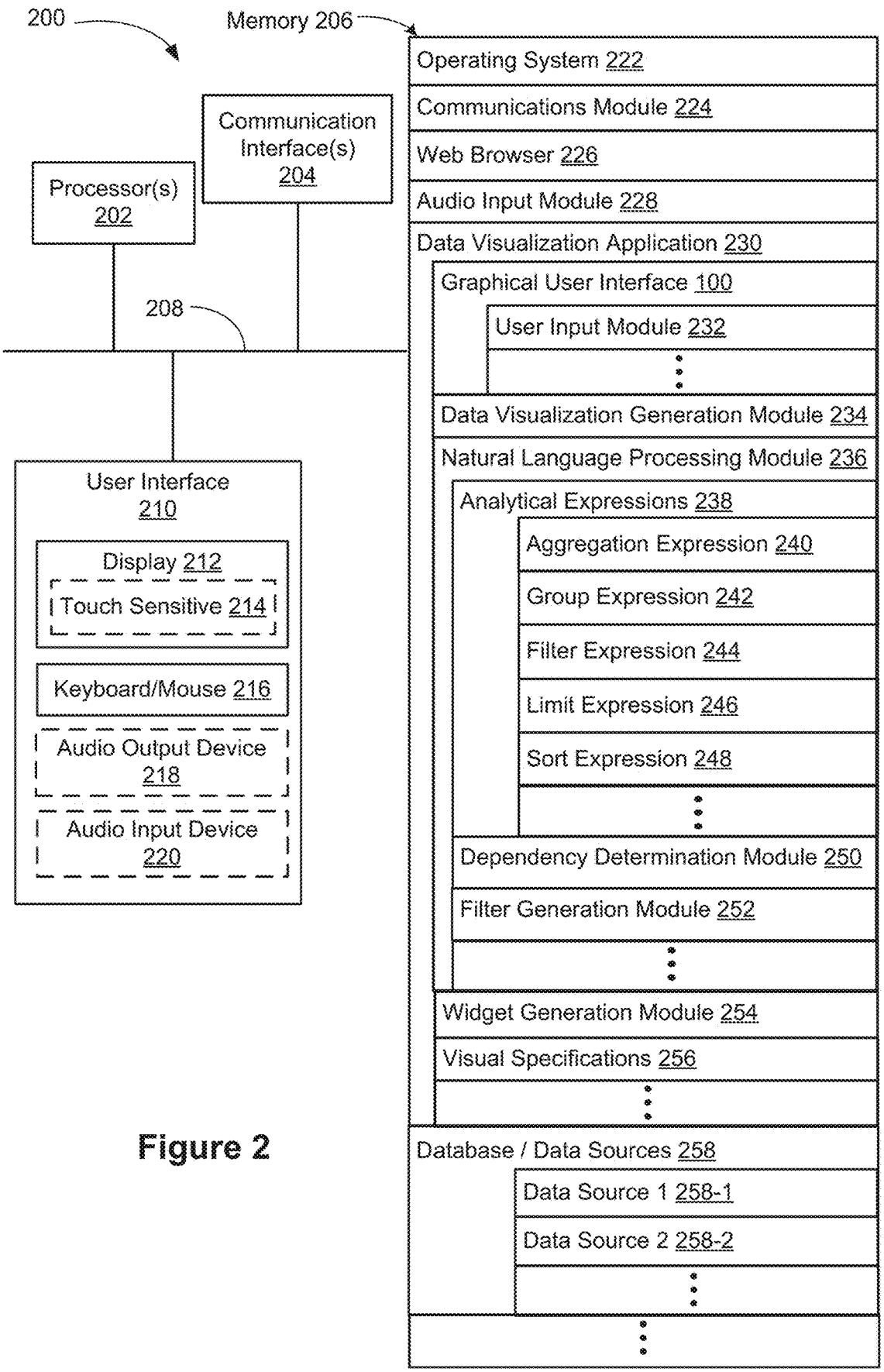
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. The communication buses 208 optionally include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230 or the natural language processing module 236);

a data visualization application 230, which generates data visualizations and related features. In some implementations, the data visualization application 230 includes:

- a graphical user interface 100 for a user to construct visual graphics. In some implementations, the graphical user interface includes a user input module 232 for receiving user input through the natural language box 124. For example, a user inputs a natural language command or expression into the natural language box 124 identifying one or more data sources 258 (which may be stored on the computing device 200 or stored remotely) and/or data fields from the data source(s). In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;
- a data visualization generation module 234, which automatically generates and displays a corresponding visual graphic (also referred to as a "data visualization" or a "data viz") using the user input (e.g., the natural language input);
- a natural language processing module 236, which receives and parses the natural language input provided by the user. The natural language processing module 236 may identify analytical expressions 238, such as:
  - aggregation expressions 240. For example, "average Sales" is an aggregate expression that includes an aggregate term "average" and an attribute "Sales";
  - group expressions 242. For example, "by Region" is a group expression that includes a group term "by" and an attribute "Region";
  - filter expressions 244. For example, "Customer Name starts with John" is a filter expression that contains an attribute "Customer," a filter "starts with", and a value "John";
  - limit expressions 246. For example, "top 5 Wineries by sum of Sales" is a limit expression that contains a limit term "top", a value "5", a group by attribute "Wineries," and an aggregation expression "sum of Sales;" and
  - sort expressions 248. For example, in "sort Products in ascending order by sum of Profit," the phrase "ascending order" is the sort term, "Products" is the attribute to group by, and "sum of Profit" is the aggregation expression;
- the natural language processing module 236 may also include a dependency determination module 250, which looks up dependencies in a database 258 to determine how particular terms and/or phrases are related (e.g., dependent);
- in some implementations, the natural language processing module 236 includes a filter generation module 252, which determines if one or more filters are related to a field that has been modified by a user. The filter generation module 252 generates the one or more filters based on user selections;
- a widget generation module 254, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field;
- visual specifications 256, which are used to define characteristics of a desired data visualization. In some implementations, the information the user provides (e.g., user input) is stored as a visual specification. In some implementations, the visual specifications 256 includes previous natural language commands received from a user or properties specified by the user through natural language commands. In some instances, a visual specification 256 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," and U.S. patent application Ser. No. 16/166,125, filed Oct. 21, 2018, titled "Determining Levels of Detail for Data Visualizations Using Natural Language Constructs," each of which is incorporated by reference herein in its entirety; and
- zero or more databases or data sources 258 (e.g., a first data source 258-1 and a second data source 258-2), which are used by the data visualization application 230. In some implementations, the data sources are stored as spreadsheet files, CSV files, XML files, flat files, or JSON files, or stored in a relational database. For example, a user selects one or more databases or data sources 258 (which may be stored on the computing device 200 or stored remotely), selects data fields from the data source(s), and uses the selected fields to define a visual graphic.

In some implementations the computing device 200 further includes an inferencing module (not shown), which is used to resolve underspecified (e.g., omitted information) or ambiguous (e.g., vague) natural language commands (e.g., expressions or utterances) directed to the databases or data sources 258, using one or more inferencing rules. Further information about the inferencing module can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

In some implementations, canonical representations are assigned to the analytical expressions 238 (e.g., by the natural language processing module 236) to address the problem of proliferation of ambiguous syntactic parses inherent to natural language querying. The canonical structures are unambiguous from the point of view of the parser and the natural language processing module 238 is able to choose quickly between multiple syntactic parses to form intermediate expressions. Further information about the canonical representations can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

In some implementations, the computing device 200 also includes other modules such as an autocomplete module, which displays a dropdown menu with a plurality of candidate options when the user starts typing into the input box 124, and an ambiguity module to resolve syntactic and semantic ambiguities between the natural language commands and data fields (not shown). Details of these sub-modules are described in U.S. patent application Ser. No. 16/134,892, titled "Analyzing Natural Language Expressions in a Data Visualization User Interface, filed Sep. 18, 2018, which is incorporated by reference herein in its entirety.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

FIG. 3 illustrates an exemplary data source 300 (e.g., the database or data source 258 in FIG. 2). The data source 300 includes a grid comprising data rows 302 and data columns 304. In the example of FIG. 3, the data source 300 comprises sales of items, and the data rows 302 are arranged according to order date.

As illustrated in FIG. 3, each of the data columns 304 has a field name. For example, the data column 304-5 has field name "State" and the data column 304-8 has field name "Category."

In the example of FIG. 3, the data fields corresponding to the data columns "Order No" 304-1, "Date" 304-2, "Customer Name" 304-3, "Address" 304-4, "State" 304-5, "Item Description" 304-6, "Part Number" 304-7, "Category" 304-8, "Sub-Category" 304-9, and "Unit Price" 304-10 are dimensions (e.g., dimensional data fields that comprise categorical data). The data fields corresponding to the data columns "Quantity" 304-11 and "Sales" 304-12 are measures (e.g., numeric quantities that can be aggregated). Each of the data rows 302 (e.g., rows 302-1, . . . , 302-K, . . . ) comprises a respective data value for each of the data columns 304. For example, the first data row 302-1 has the data value "CA" for the data column "State" 304-5. The fourth data row 302-4 has the data value "Office Supplies" for the data column "Category" 304-8.

In some implementations, one or more of the data columns 304 are calculated based on data values of one or more data fields in the data source 300. In the example of FIG. 3, the data column 304-12 "Sales" is an calculated data column: each of the data values in the data column 304-12 is the product of the unit price and the quantity for the data row.

In some implementations, the data columns 304 include some data columns that are created by the data visualization application 230.

In the example of FIG. 3, the data source 300 is a partial view of an entire data source (e.g., the data source 258). In other words, the complete data source contains more data columns and rows than is shown in FIG. 3. Further, in this example, the data source 300 is a data structure (e.g., spreadsheet) that includes a plurality of data values stored in data columns. In some implementations, the data source 300 is a raw (e.g., original or unformatted) data source. In some implementations, the data source fields are un-aggregated.

In some implementations, the data visualization application 230 processes data values (e.g., raw data values) of existing data columns to create new data columns, as described in U.S. patent application Ser. No. 16/218,283, titled "Systems and Methods for Preparing Raw Data for use in Data Visualizations," which is incorporated by reference herein in its entirety. Referring to FIG. 3, the data visualization application 230 may create a new data column 304-5 "State" and determine each of the data values of the data column 304-5 from the corresponding address of the data row (e.g., by identifying delimiting locations, such as comma positions). In this way, the data values (e.g., states) can be extracted and used in data visualization without requiring any user input.

FIGS. 4A-4I provide a series of screen shots for displaying visual representations on a graphical user interface 100 based on the data source 300 of FIG. 3, in response to natural language commands entered by a user, according to some implementations.

Figure 4A:
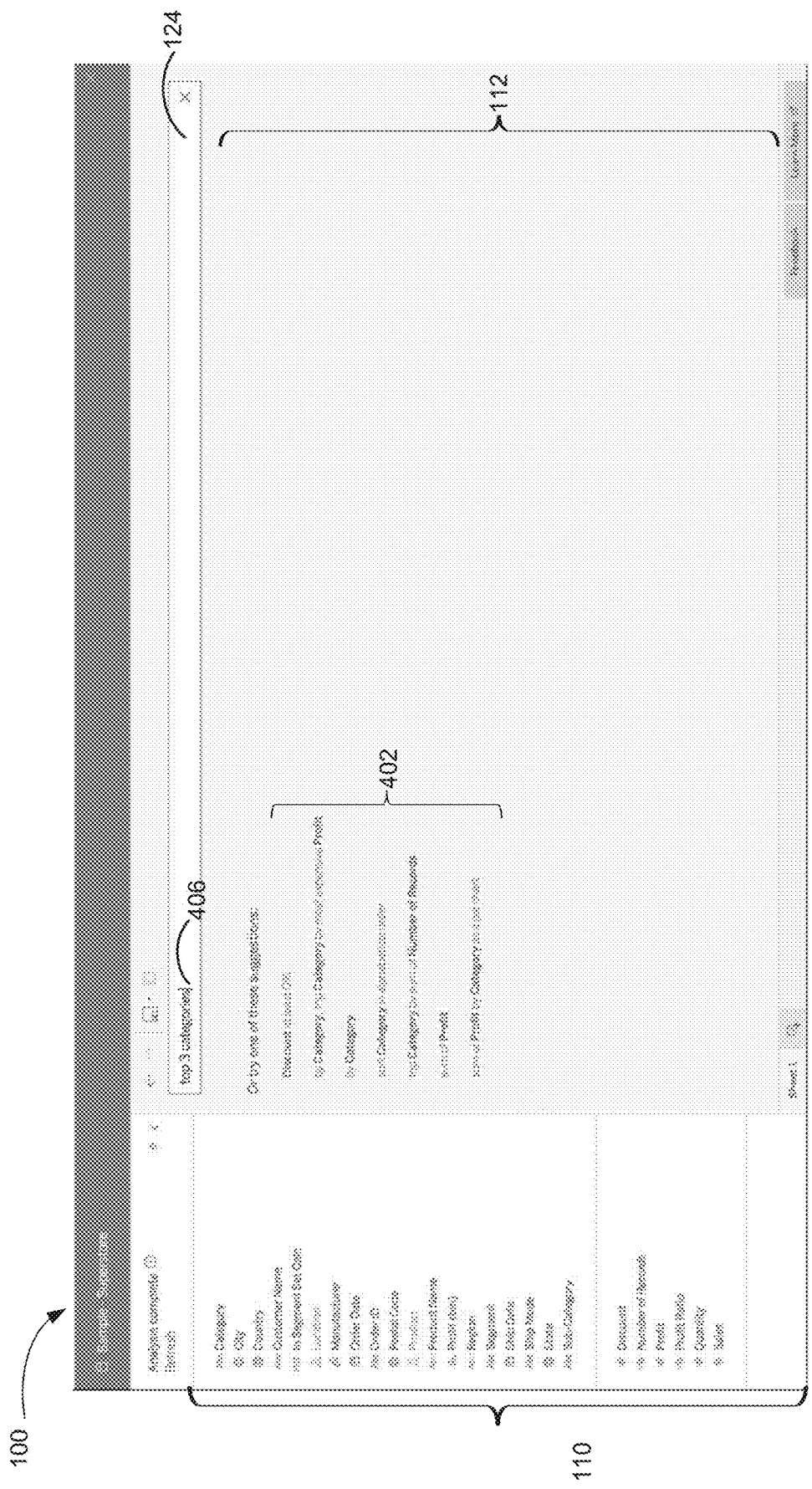
FIGS. 4A-4I provide a series of screen shots for displaying visual representations on a graphical user interface based on the data source of FIG. 3, in response to natural language commands entered by a user, according to some implementations.

In some implementations, as illustrated in FIG. 4A, the data visualization region 112 displays suggestions 402 (e.g., guidelines, tips, pointers, and/or possible queries) to assist the user in interacting with the data source. In some implementations, the data visualization region 112 may also display a prompt (not shown), which may open a Help pane (not shown) or take the user to a support site that provides the user with more information about a feature (not shown).

FIG. 4A also illustrates a user interaction with the graphical user interface 100. In this example, the user inputs (e.g., enters or types) a natural language expression (e.g., a natural language command) 406 "top 3 categories" into the command box 124. The user may also input the natural language expression by speech, which is then captured using an audio input device 220 (e.g. a microphone) coupled to the computing device 200. Typically, the natural language expression includes one or more terms that identify data fields from a data source 258 (e.g., the data source 300 in FIG. 3). A term may be a dimension (e.g., categorical data) or a measure (e.g., a numerical quantity). As illustrated by the example, the natural language input typically includes one or more terms that identifies the data field in the data source. For example, the term "category" identifies the data field "Category" 304-8 in the data source 300.

In some implementations, as described in U.S. patent application Ser. No. 16/166,125, after the user inputs the natural language command, the natural language processing module 236 parses the command into tokens. In some implementations, the natural language processing module 236 may use a lexicon corresponding to the data source 258 to identify analytical concepts, aggregation type, and data fields to be aggregated. In this example, the natural language processing module 236 identifies that the natural language command includes a limit concept (e.g., "top 3"). As indicated in FIG. 4B, the top three categories are determined by the number of records in each category.

Figure 4B:
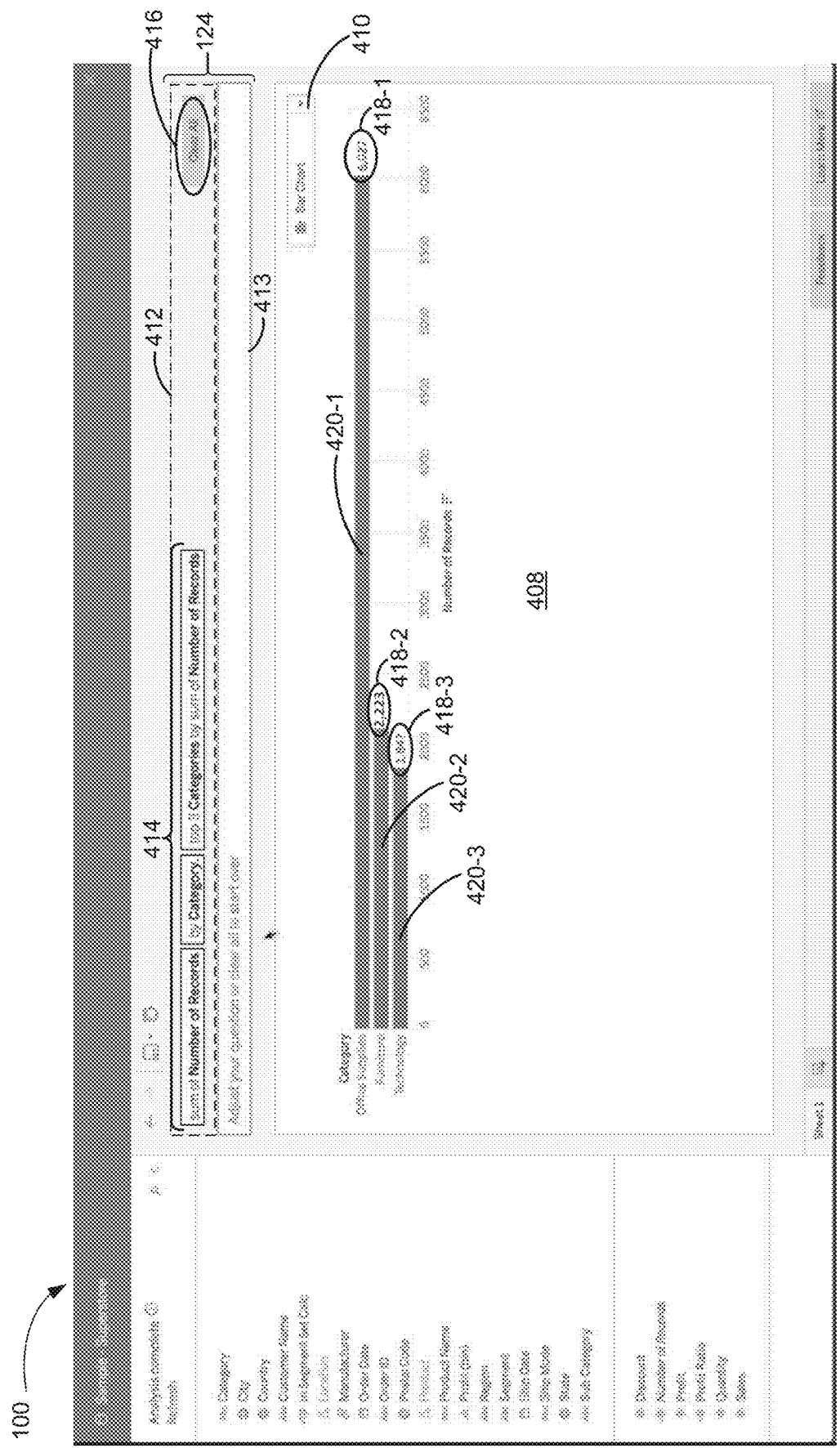

FIG. 4B illustrates display of a data visualization 408 (e.g., a horizontal bar graph) on the graphical user interface 100 in response to the natural language command. In this example, the data visualization 408 includes three data marks (e.g., bars on the horizontal bar graph) "Office Supplies" 420-1, "Furniture" 420-2, and "Technology" 420-3.

Each of the data marks corresponds to a distinct data value (i.e., a different category) of the data field "Category" 304-8 in the data source 300. The data marks are displayed in descending order based on "Number of Records." The data visualization 408 also displays, next to each of the data marks, a respective count 418 (408-1, 408-2, and 408-3, specifying the number of records) corresponding to the data mark. In some implementations, the type of data visualization may be changed by using a view type selector 410.

In some implementations, as depicted in FIG. 4B, the command box 124 bifurcates into a command summary region 412 and a delta input box 413 as soon as there is a working natural language command. A user can edit the natural language command in the command summary region 412, and the user can also edit the working natural language command by entering an adjustment command in the delta input box 413. The command summary region 412 includes the phrases 414 that define the data visualization 408. In this example, the phrases 414 "sum of Number of Records," "by Category," and "top 3 Categories by sum of Records" indicates that generation of the data visualization 408 includes aggregating (e.g., counting) the number of records for each distinct data value of the data field "Category." The aggregated number of records are then arranged (e.g., sorted in descending order). Display of the data visualization 408 is limited to the top three categories based on the total number of records.

As further illustrated in FIG. 4B, the phrases 414 include terms corresponding to data fields in the data source. In this example, the term "Category" is a data field in the data source and "Number of Records" is a count of rows from the data source. These terms are displayed in a visually distinct way (e.g., boldface) from other terms in the phrases 414 to indicate that they represent data. In some implementations, as described in U.S. patent application Ser. No. 16/680,431 (incorporated by reference herein in its entirety), user selection of one of the terms in the phrases 414 may cause a widget to be generated and displayed (e.g., using the widget generation module 254) (not shown). The user may interact with the widget to modify data values and/or data fields, to cause generation and display of another data visualization (not shown).

In FIG. 4B, the graphical user interface 100 also displays a "Clear All" icon (e.g. button) 416. In some implementations, clicking on the Clear All button 416 removes any phrases 414 from the command summary box and removes any data visualization 408 from the data visualization region 112.

Figure 4C:
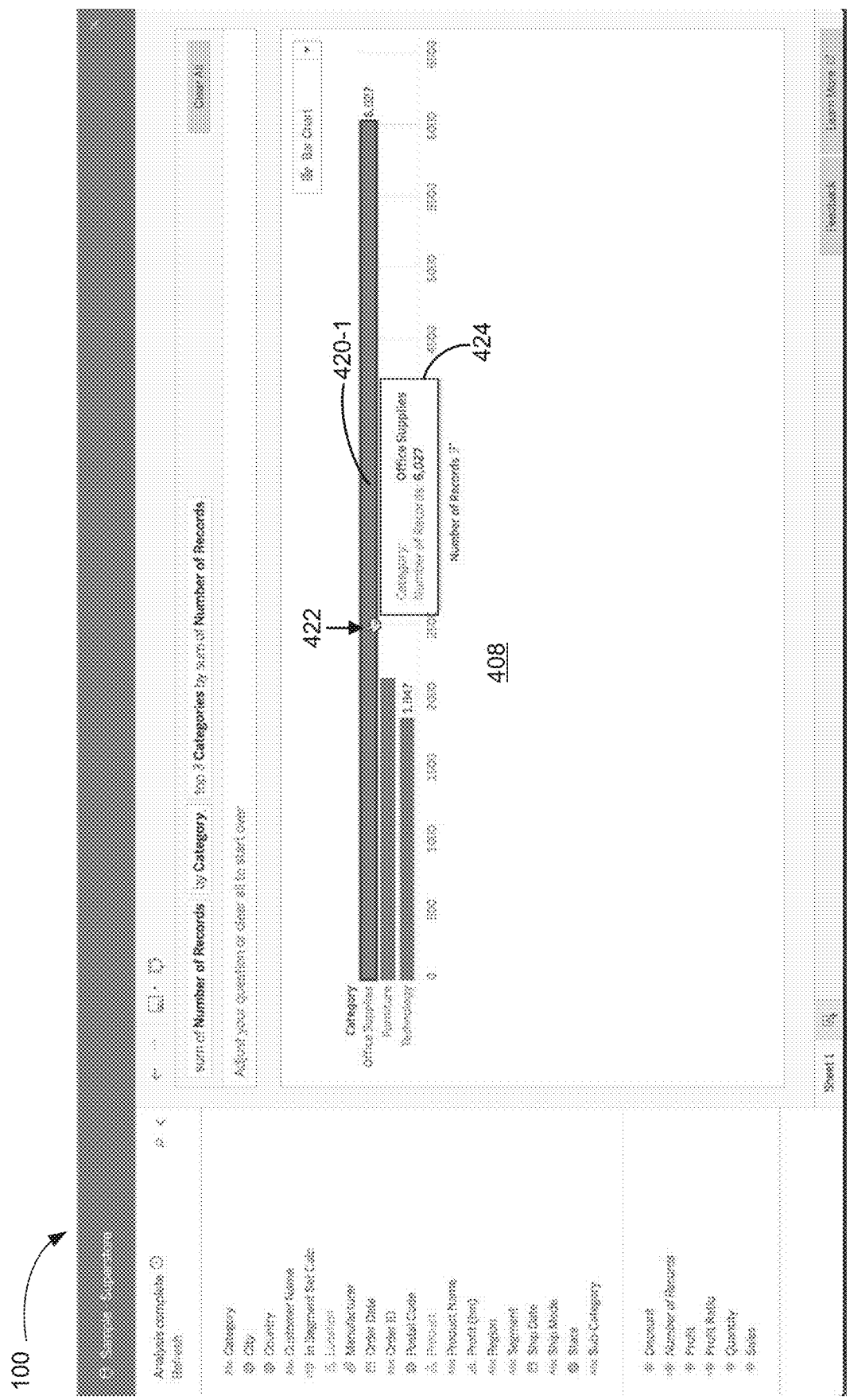

FIG. 4C illustrates a user hovering over (422) the data mark "Office Supplies" 420-1 of the data visualization 408. In response to the hovering, a widget 424 (e.g., a data widget) is generated and displayed (e.g., using the widget generation module 254). The widget 424 displays the data field and the data value (e.g., "Category: Office Supplies") corresponding to the data mark 420-1. The widget 424 also displays the number of records (e.g., "Number of records: 6,027") corresponding to the data mark 420-1.

Figure 4D:
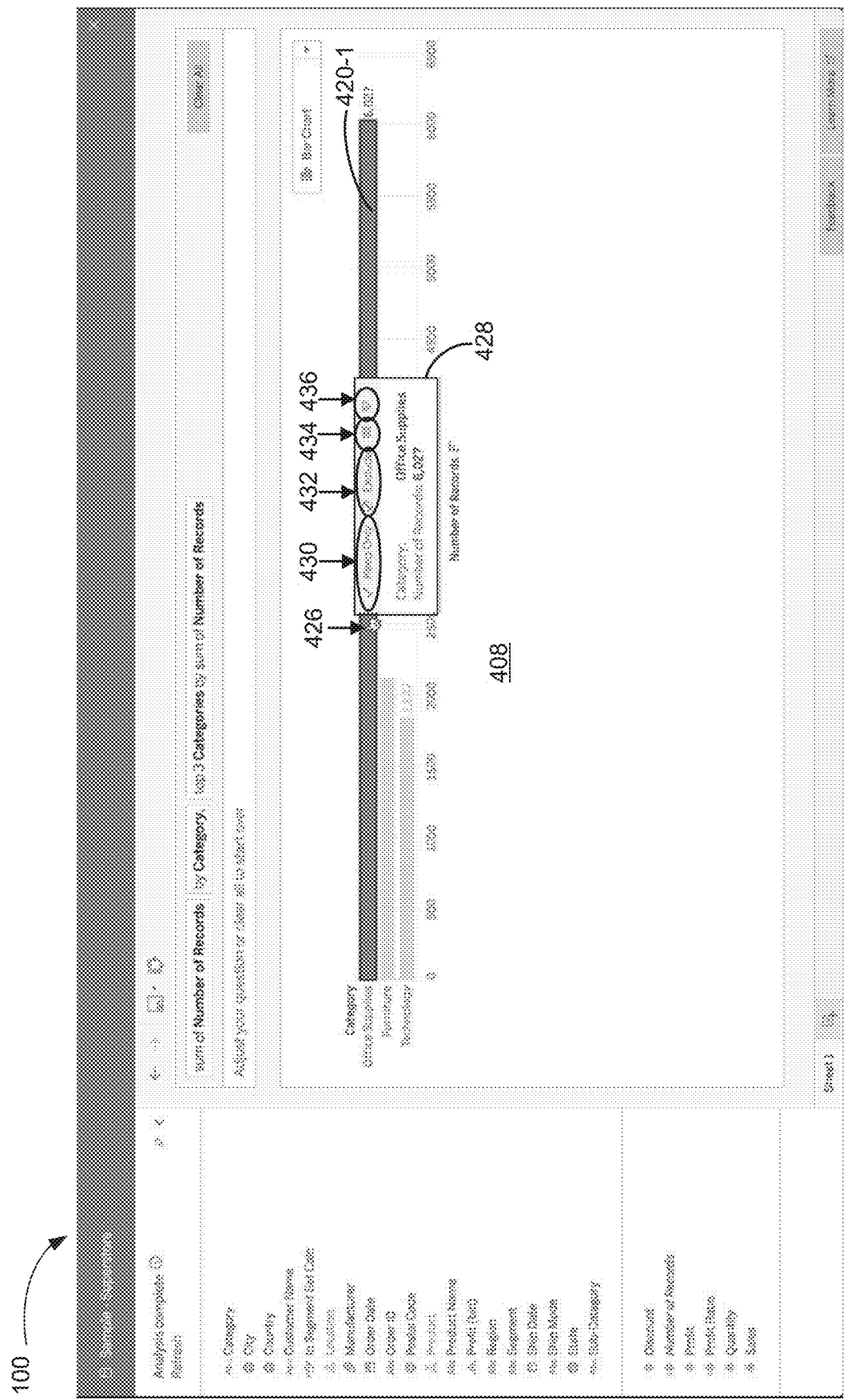

FIG. 4D illustrates another user interaction with the data mark 420-1 "Office Supplies." In this example, a user selects 426 (e.g., via a mouse click, or other input) the data mark 420-1. In some implementations, as illustrated in FIG. 4D, user selection of the data mark 420-1 prompts display of an expanded widget 428, which includes affordances in addition to the details included in the widget 424 in FIG. 4C. In the example of FIG. 4D, the widget 424 displays user-selectable affordances, including a "Keep Only" affordance 430, an "Exclude" affordance 432, an "arrange" affordance 434, and a drill down affordance 436.

In some implementations, user selection of the "Keep Only" affordance 430 includes only the data mark 420-1 for display in the data visualization 408 and excludes from display in the data visualization 408 other data marks (not shown).

In some implementations, user selection of the "Exclude" affordance 432 excludes the data mark 420-1 from display in the data visualization 408 and includes in the display of the data visualization 408 other data marks (not shown).

In some implementations, as illustrated in FIG. 4D, user selection of the data mark 420-1 causes the data mark 420-1 to be visually emphasized and causes other data marks of the data visualization (e.g., the data marks 420-2 and 420-3) to be visually de-emphasized.

Figure 4E:
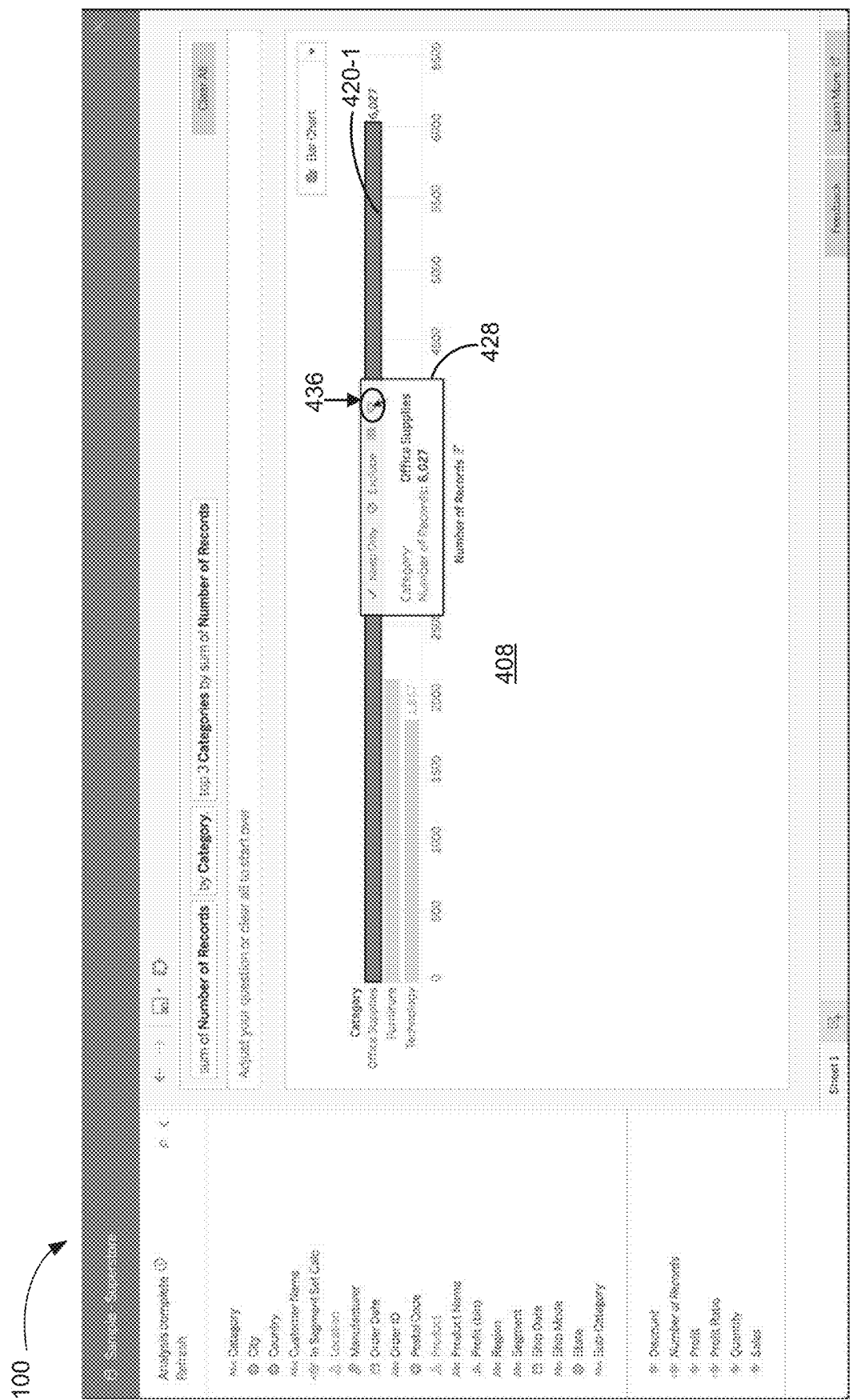

FIG. 4E illustrates a user interaction with the drill down affordance 436 in the widget 428. In this example, the user selects (e.g., via a mouse click or other input) the drill down affordance 436.

Figure 4F:
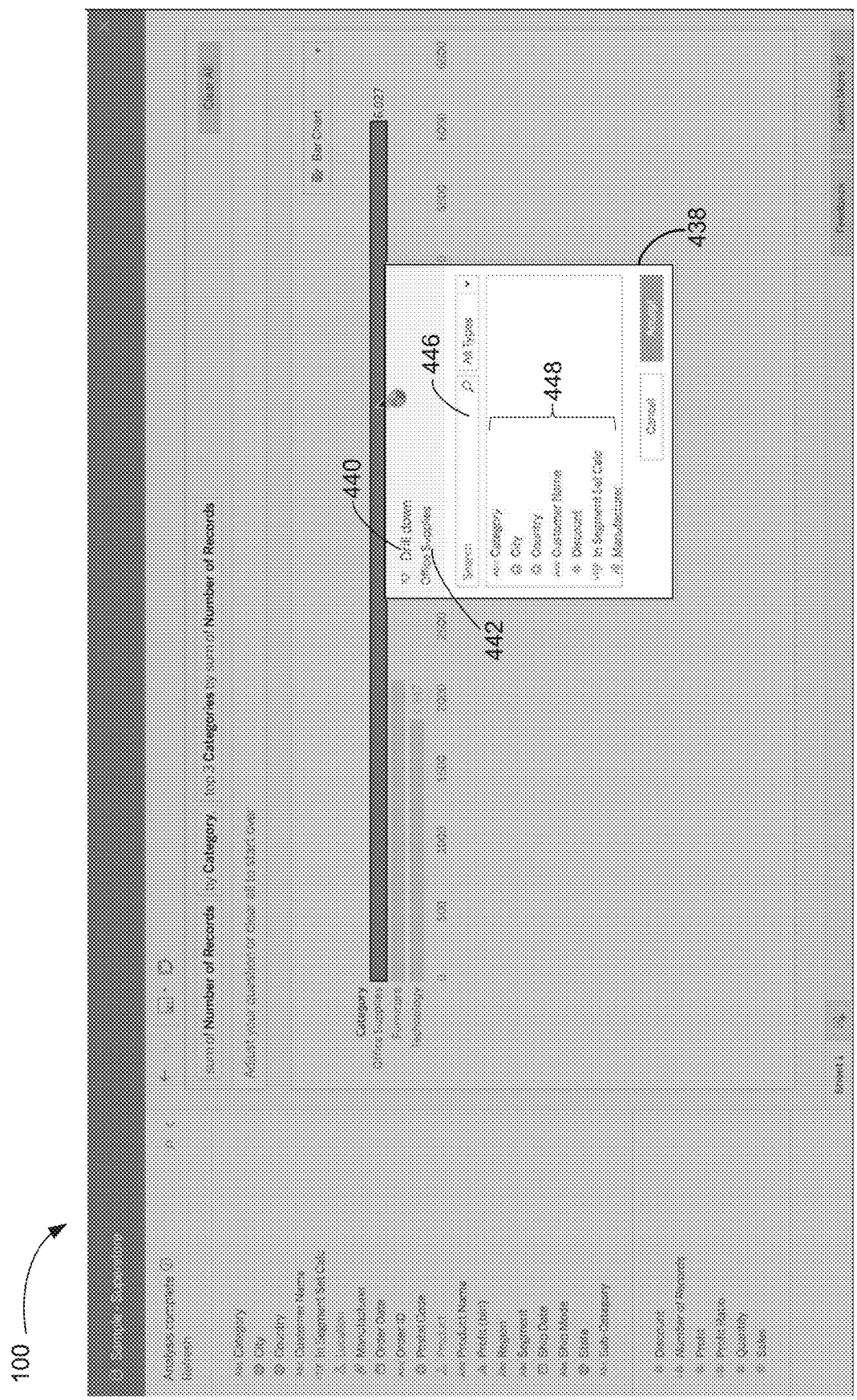

FIG. 4F illustrates a drill down widget 438, which is generated (e.g., using the widget generation module 254) and displayed in response to the user selection of the drill down affordance 436 in FIG. 4E. The drill down widget 438 displays an identifier 440 (e.g., "Drill Down") and a label "Office Supplies" 442 below the identifier, thus indicating that the drill down widget 438 is for seeking additional information specific to the data value "Office Supplies." The widget 438 also displays a search bar 446 and data fields 448 in the dataset 300.

Figure 4G:

FIG. 4G illustrates user interaction with the drill down widget 438. In this example, the user inputs (e.g., types) the word "sub" in the search bar 446. In response to the user input, the widget 438 displays the data field "Sub-Category." The user selects the data field "Sub-Category."

Figure 4H:
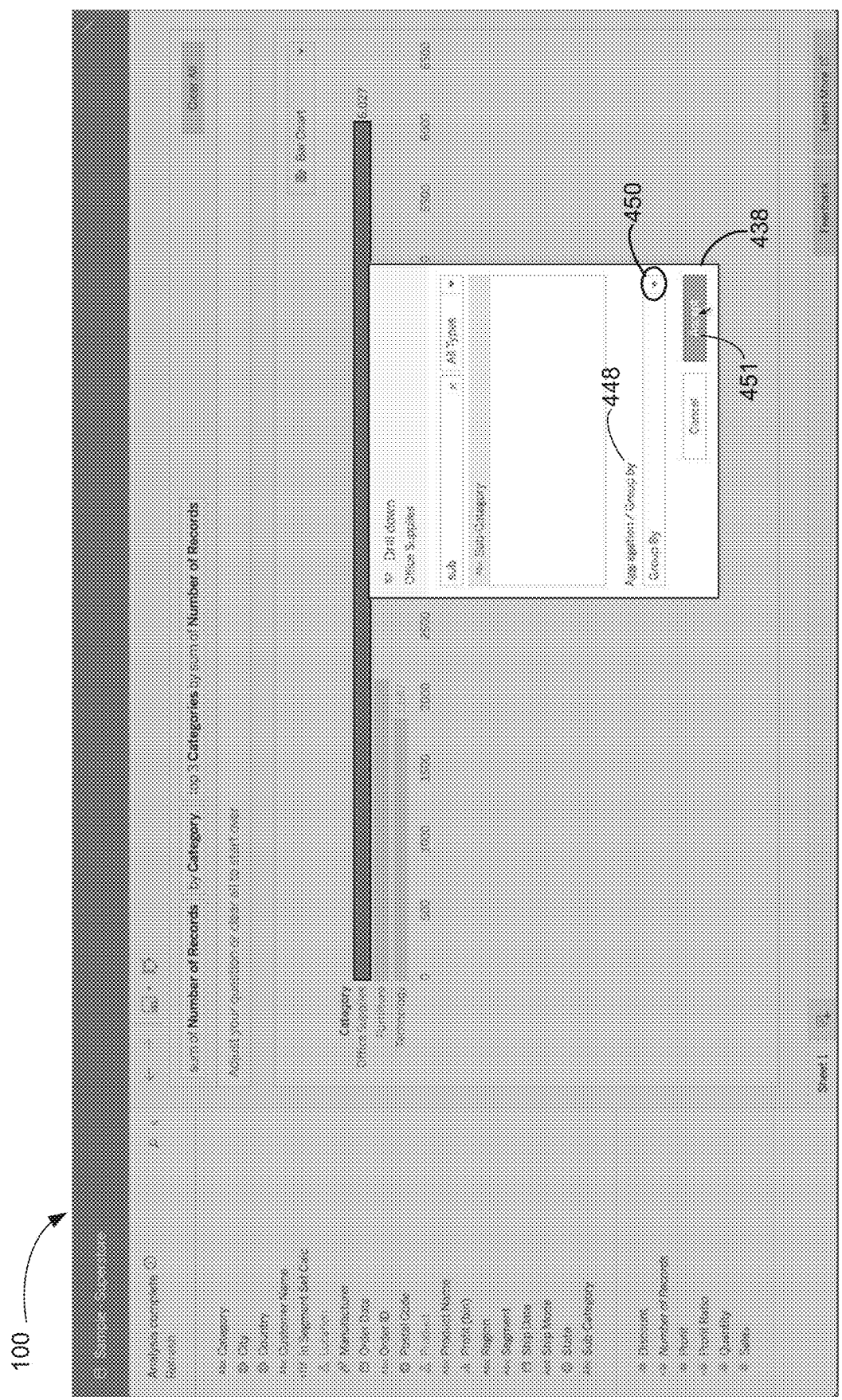

In some implementations, in response to the user selection of a data field in the widget 438, an "Aggregation/Group by" option 448 is generated (e.g., using the widget generation module 254) and displayed in the widget 438, as illustrated in FIG. 4H. As discussed in greater detail in FIGS. 6A-6H, the user may select an aggregation operator using a drop-down button 450, to aggregate the selected data field.

Figure 4I:
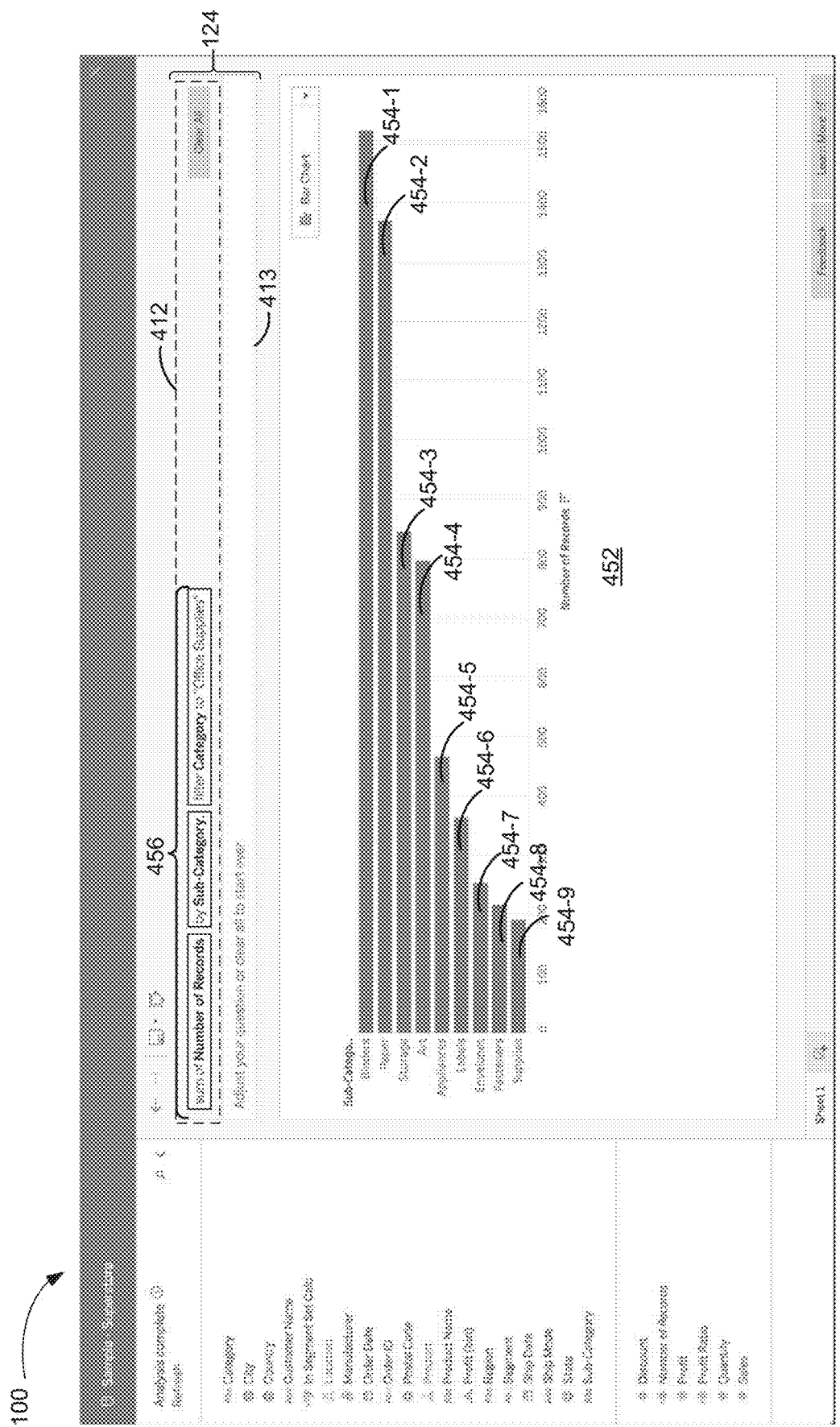

FIG. 4I illustrates an updated data visualization 452 that is generated and displayed on the graphical user interface 100 in response to user selection of the "Accept" button 451 in FIG. 4G. In this example, the data visualization 452 is a horizontal bar graph that comprises "Sub-Categories" on the y-axis and "Number of Records" on the x-axis. The bar graph 452 has data marks 454 (e.g., data bars) for "Binders" 454-1, "Paper" 454-2, "Storage" 454-3, "Art" 454-4, "Appliances" 454-5, "Labels" 454-6, "Envelopes" 454-7, "Fasteners" 454-8, and "Supplies" 454-9. In this example, the data field "Sub-Category" is hierarchically related to the data field "Category." Each of the data marks 454 shows data for a data value corresponding to a respective sub-category of "Office Supplies." The data marks are arranged in a descending order according to the number of records.

As further illustrated in FIG. 4I, the phrases 456 that define the data visualization 452 include "sum of Number of Records," "By Sub-Category," and "filter Category to 'Office Supplies.'" In this example, and referring to the partial view of the data source 300 in FIG. 3, the phrases 456 indicate that generation of the data visualization 452 includes filtering data rows of the data source 300 to the subset of rows whose data value for the data field "Category" is "Office Supplies" (e.g., the data rows 302-1, 302-4, 302-5, 302-7, 302-8, 302-9, and 302-12 in FIG. 3). The filtered subset of rows also correspond to records referenced by the data mark 420-1 in FIG. 4C. Furthermore, a comparison between the phrases 414 (see FIG. 4B) and the phrases 456 shows that the grouping "by Category," which defines the data visualization 408, has been replaced with another grouping "by sub-Category" to generate the data visualization 452. In the data visualization 452, the data rows of the subset are grouped according to different sub-categories (e.g., grouped by data values of another dimension "Sub-Category"). Thus, data rows 302-1 and 302-7, which both have the same data value "Envelopes" for the field "Sub-Category" are grouped. Similarly, data rows 302-4 and 302-9 are also grouped because they have the same sub-category "Binders." The number of records is then summed for each of the sub-categories to generate the data visualization 452. Thus, the data visualization 452 enables a user to "drill down" from a "bigger picture" data visualization, such as the data visualization 408 that depicts the top 3 categories, down to a specific data value (e.g., "Office Supplies"), and further breaking down into different sub-categories of the data value "Office Supplies," to understand how each of the sub-categories contributes toward the sale of office supplies.

FIGS. 5A-5G provide a series of screen shots for updating a data visualization according to some implementations.

Figure 5A:
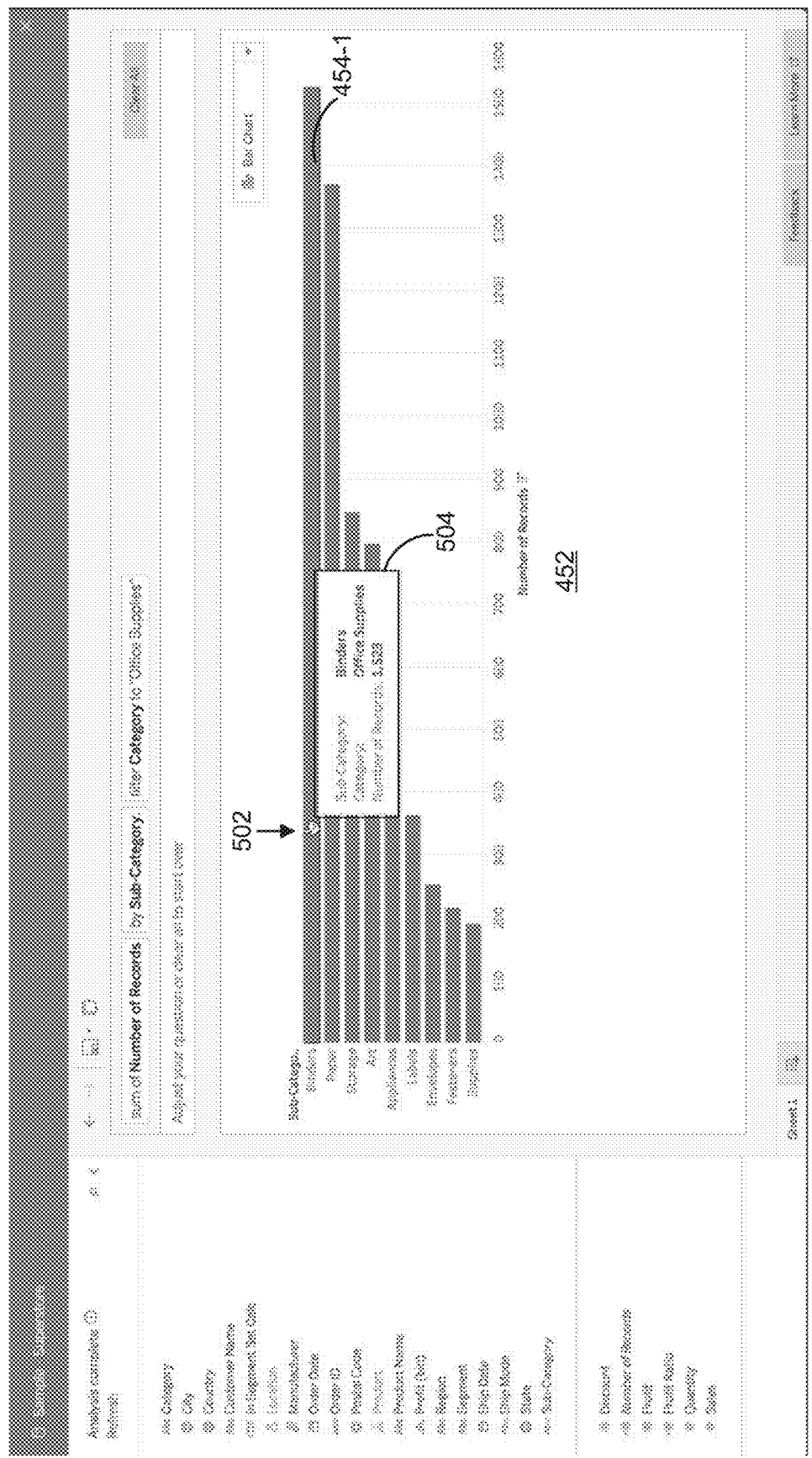
FIGS. 5A-5G provide a series of screen shots for updating a data visualization according to some implementations.

FIG. 5A illustrates user interaction with the data visualization 452 in FIG. 4I. In this example, the user hovers over the data mark "Binders" 454-1 (e.g., via a mouse). In response, a data widget 504 is generated (e.g., using the widget generation module 254). The data widget 504 is displayed proximate (e.g., adjacent) to the pointer 502. The widget 504 provides details about the data value and data field corresponding to the data mark 454-1 (e.g., "Sub-Category: Binders"), the data value and data field from which the data mark 454-1 is derived (e.g., "Category: Office Supplies"), and the number of records corresponding to the data mark 454-1 (e.g., "1,523").

Figure 5B:
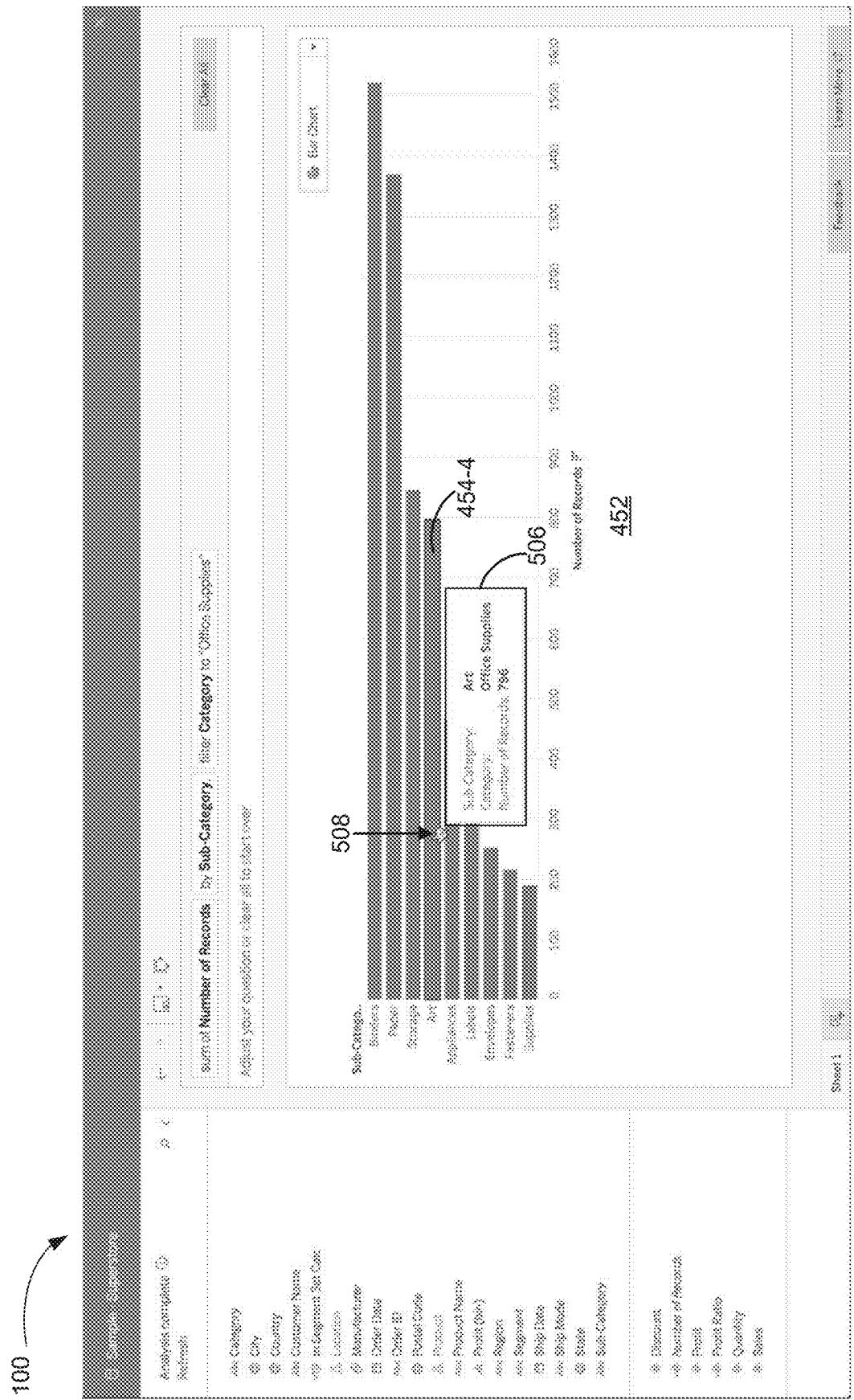

FIG. 5B illustrates user interaction with the data bar "Art" 454-4. Similar to that described in FIG. 5A, in response to the user interaction, a new data widget 506 provides details about the data value and data field corresponding to the "Art" data mark 454-4, the data value and data field from which the data mark 454-4 is derived (e.g., filtered) (e.g., "Category: Office Supplies"), and the number of records corresponding to the data mark 454-4 (e.g., "796").

Figure 5C:
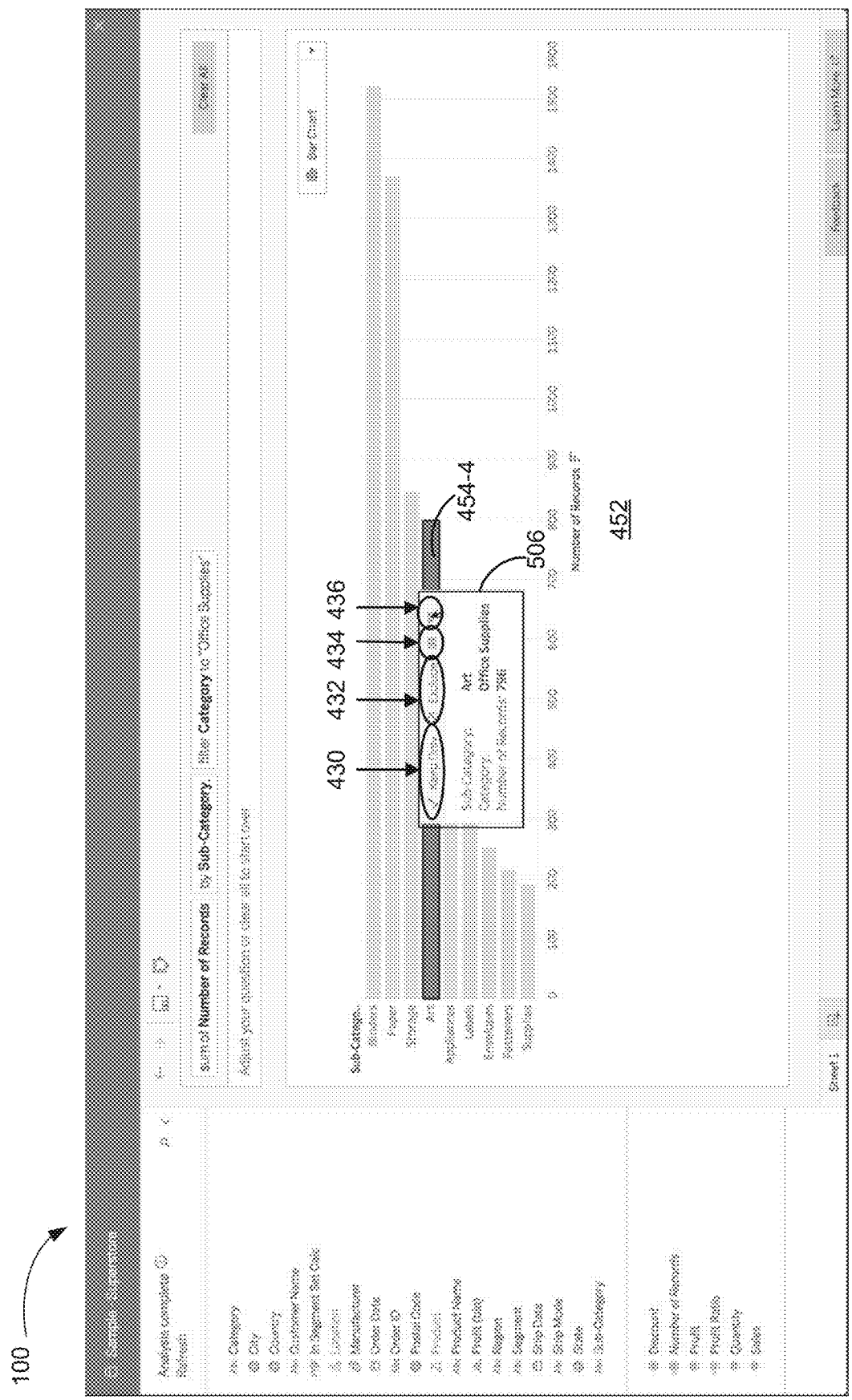

FIG. 5C illustrates another user interaction with the data mark 454-4. In this example, a user selects the data mark 454-4. In response to the user selection of the data mark 454-4, the updated widget 506 displays the additional affordances including the "Keep Only" affordance 430, the "Exclude" affordance 432, the "arrange" affordance 434, and the drill down affordance 436, as described previously in FIG. 4D.

Figure 5D:
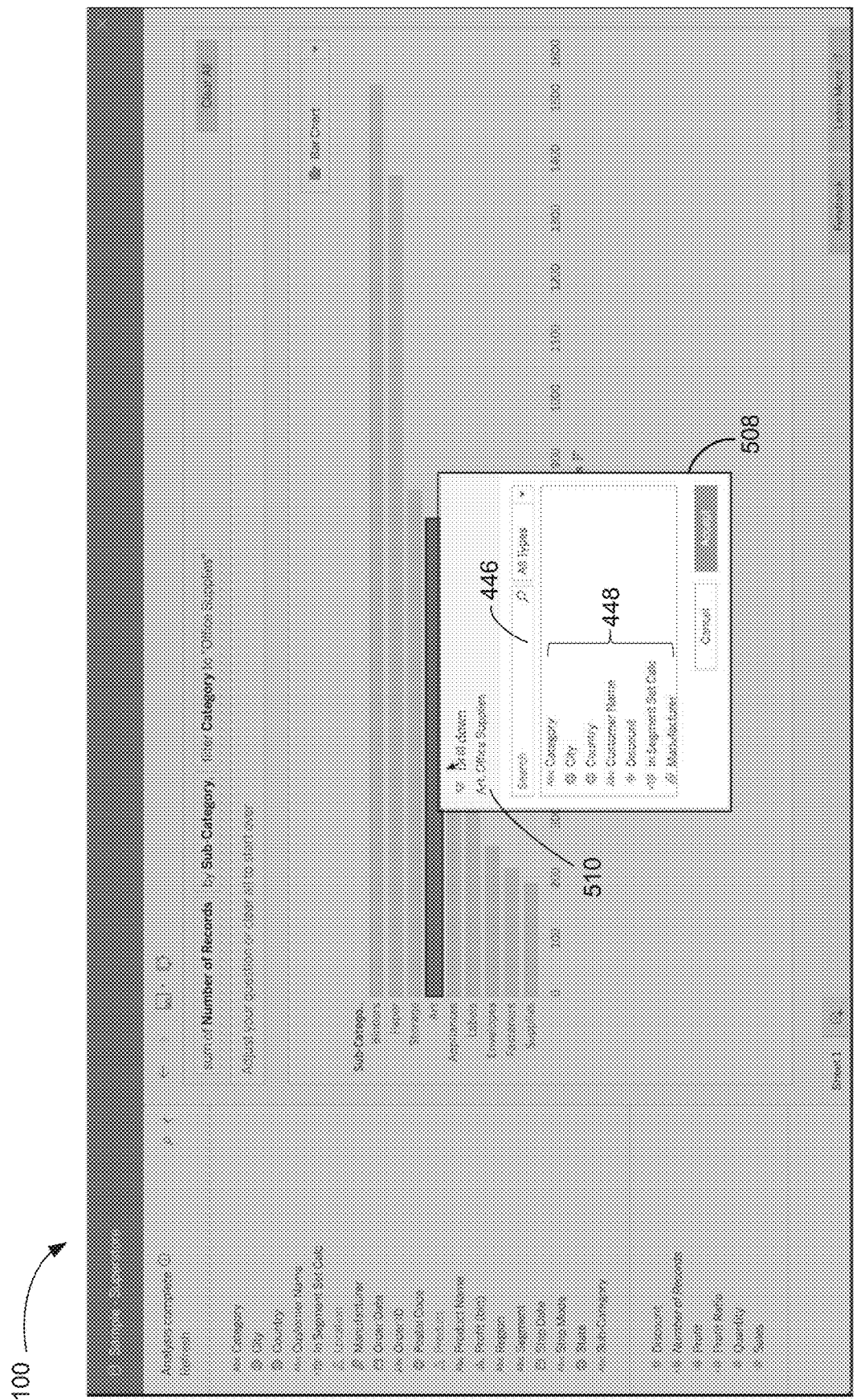

FIG. 5D illustrates a drill down widget 508, which is generated (e.g., using the widget generation module 254) and displayed in response to the user selection of the drill down affordance 436 in FIG. 5C. In this example, the widget 508 includes a label "Art, Office Supplies" 510, which identifies the data values ("Art" and "Office Supplies") that the user is eliciting more details from.

In some implementations, the data values in the label 510 are displayed based on recency of the drill down operation. For instance, the data value corresponding to the most recent drill down operation is displayed first, as illustrated in FIG. 5D. In another implementation (not shown), the data value corresponding to the most recent drill down operation is displayed last in the label 510.

In some implementations, the data values in the label 510 are displayed according to an order of hierarchy of the data fields to which the data values correspond. For example, "Art" is a data value of the data field "Sub-Category" whereas "Office Supplies" is a data value of the data field "Category." Thus, the data values in the label 510 are displayed in an ascending order of hierarchy of the corresponding data fields. In some implementations, the data values in the label 510 are displayed in a descending order of hierarchy of the corresponding data fields (not shown).

Figure 5E:
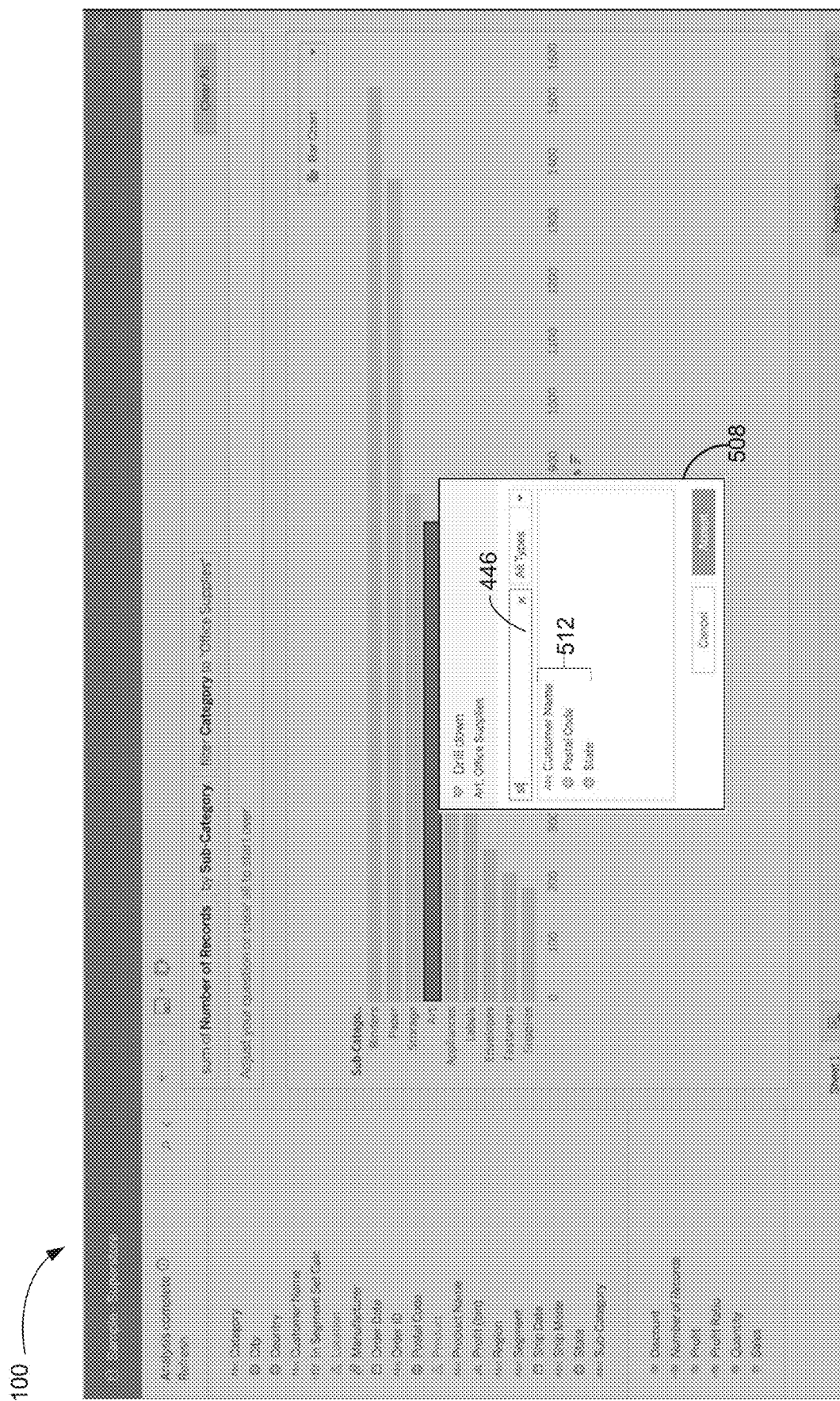

FIG. 5E illustrates user interaction with the drill down widget 508. In this example, the user inputs the letters "st" into the search bar 446. In response to the user input, the data widget displays a subset 512 (e.g., "Customer Name," "Postal Code," and "State") of the data fields 448 that contain the letter combination "st" somewhere in the data field name. When the user enters two more characters to form "stat" in the search bar 446, there is only one item remaining in the displayed subset, as illustrated in FIG. 5F.

Figure 5F:
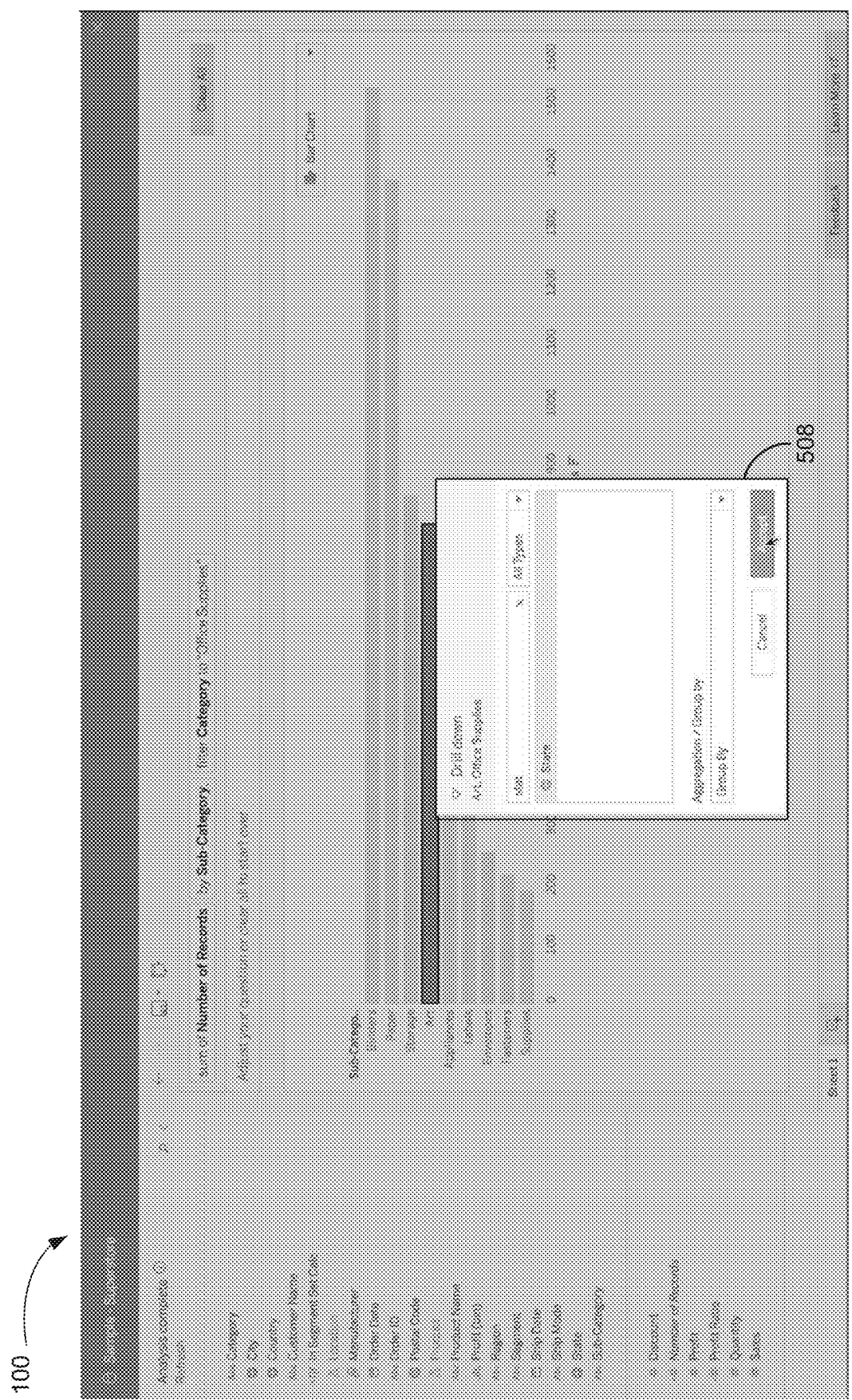
Figure 5G:
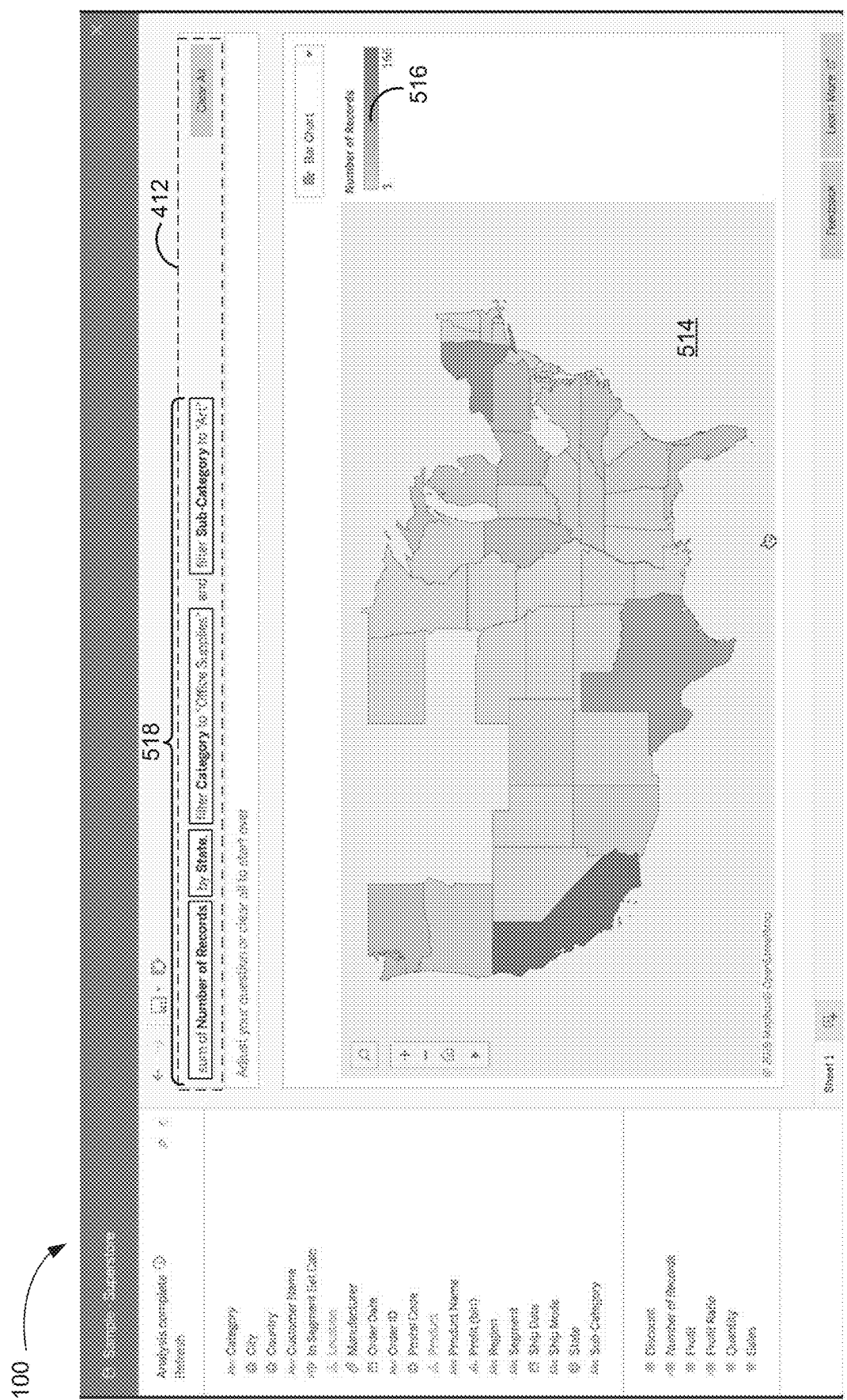

FIG. 5G illustrates an updated data visualization 514 (a map of the United States), which is generated and displayed in the graphical user interface 100 in response to user selection of the data field "State" in FIG. 5F. In this example, each of the states on the map 514 is a data mark corresponding to a distinct data value for the data field "State." The data visualization 514 also includes a legend 516 to show how the colors of the states on the map correspond to the number of records. The data visualization 514 is based on the phrases 518, which include a first phrase "sum of Number of Records," a second phrase "by State," a third phrase "filter Category to 'Office Supplies,'" and a fourth phrase "filter Sub-Category to 'Art.'" In this example, the data field "State" is added as a grouping whereas the sub-category "Art" is appended as a filter in addition to the existing filter on "Office Supplies." In other words, the data visualization application 230 filters data rows of the dataset to a subset of rows whose data value for the data field "Category" matches the data value "Office Supplies" (e.g., the data rows 302-1, 302-4, 302-5, 302-7, 302-8, 302-9, and 302-12 in FIG. 3) and whose data value for the data field "Sub-Category" matches the data value "Art" (e.g., the data row 302-8). Finally, the data visualization application 230 groups data rows of this subset of rows according to different data values (e.g., the different states) of the data field "State."

FIGS. 6A-6H provide a series of screen shots for updating a data visualization according to some implementations.

Figure 6A:
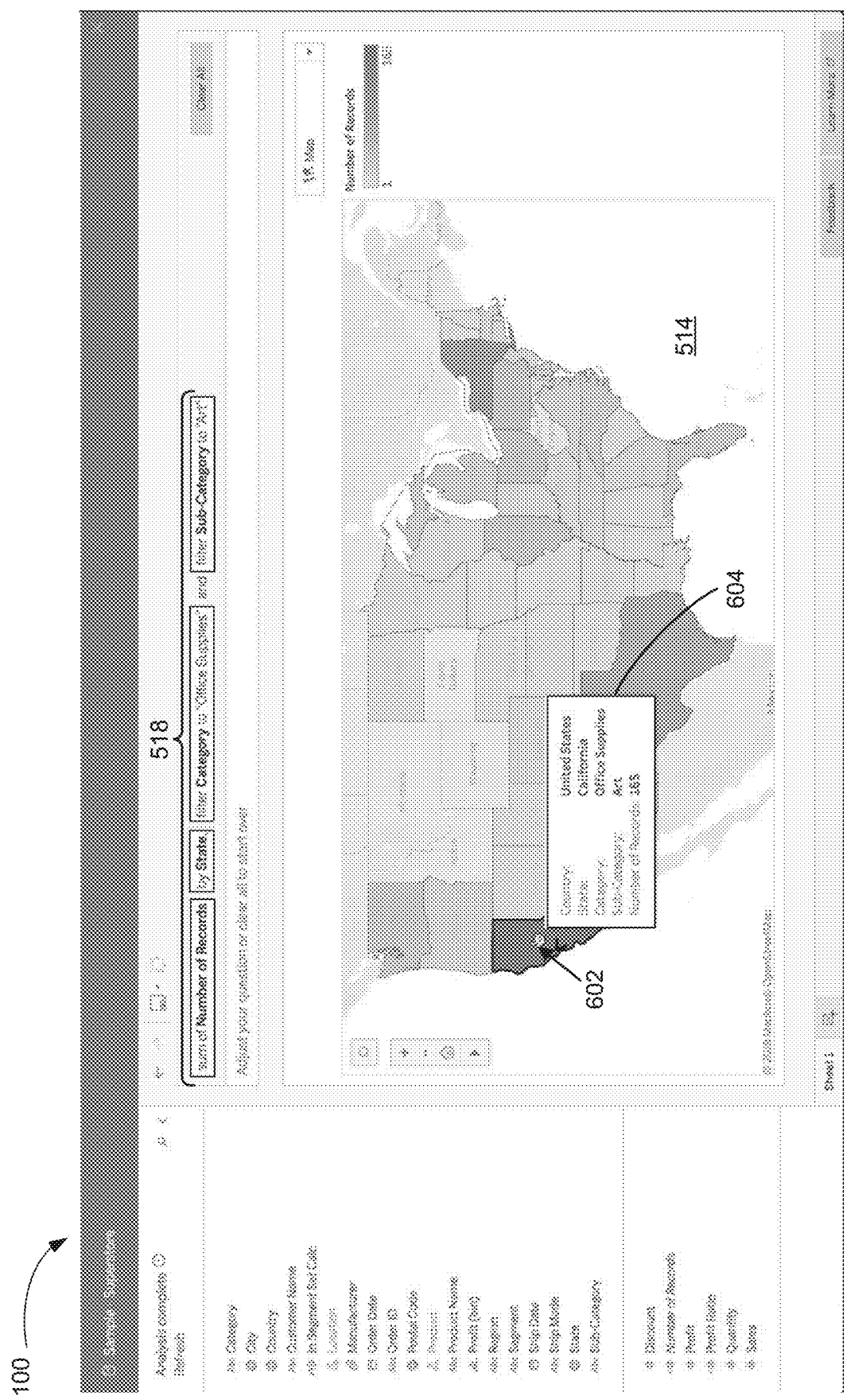
FIGS. 6A-6H provide a series of screen shots for updating a data visualization according to some implementations.

FIG. 6A illustrates user interaction with the data visualization 514. In this example, the user hovers over the portion of the map corresponding to the data mark for "California" (e.g., using a pointer 602). In response to the user interaction, a data widget 604 is generated (e.g., using the widget generation module 254) and displayed on the graphical user interface 100, at a location adjacent to the pointer 602. The data widget 604 provides details about the country (e.g., "United States"), state (e.g., "California"), category (e.g., "Office Supplies"), sub-Category (e.g., "Art"), and number of records (e.g., "165") corresponding to the data mark "California."

Figure 6B:
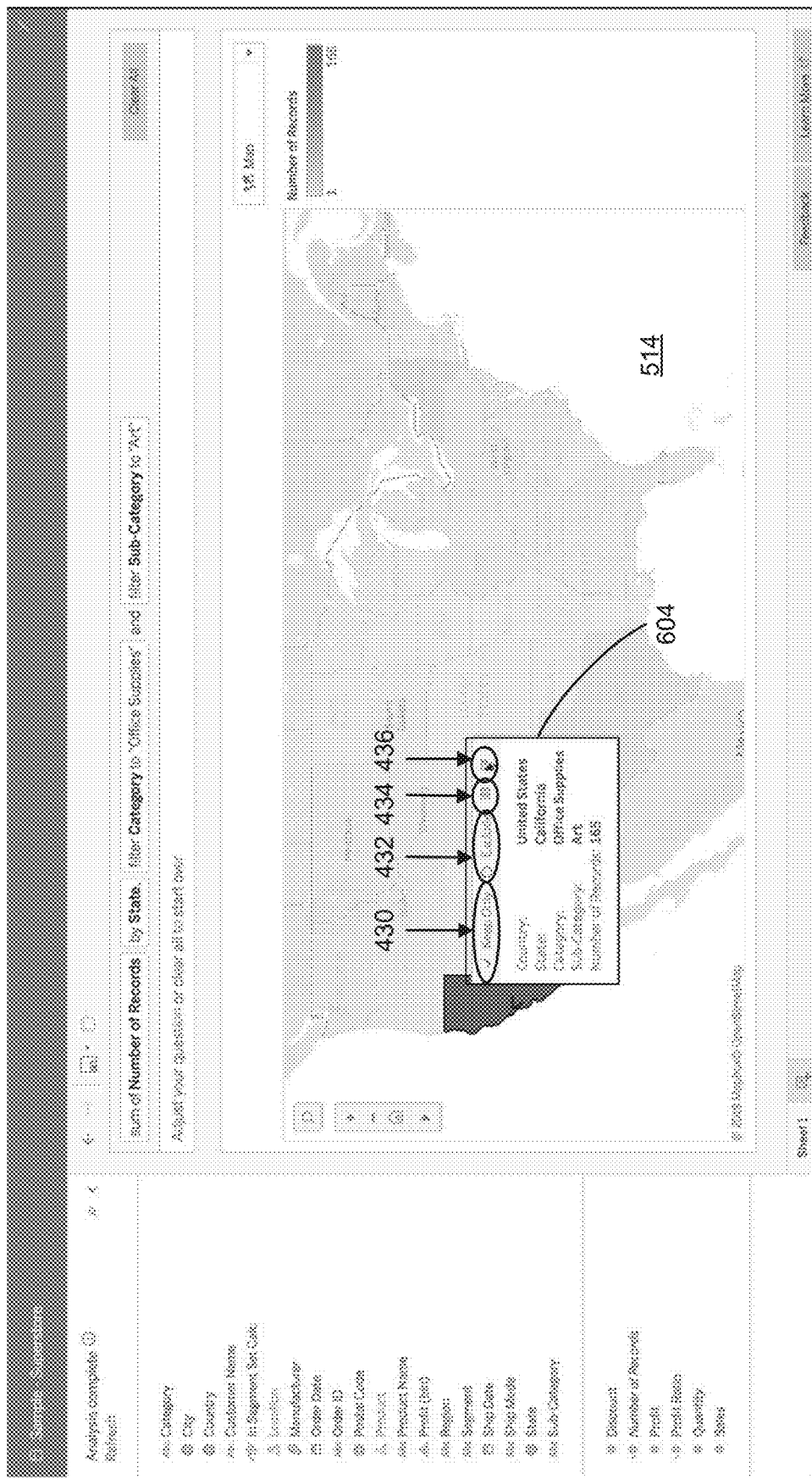

FIG. 6B illustrates user selection of the data mark "California." In response to the user selection, the data widget 604 displays the affordances 430, 432, 434, and 436, as described previously in FIGS. 4D and 5C.

Figure 6C:

FIG. 6C illustrates a drill down widget 606, which is generated and displayed in response to the user selection of the drill down affordance 436 in FIG. 6B. The widget 606 includes a label 608 "California, Office Supplies, Art." The label 608 informs a user that she is looking into the conjunction of the data values "California," "Office Supplies," and "Art."

In this example, the label 608 displays the data value corresponding to the most recently drill down operation (e.g., "California") first, followed by the data values corresponding to previously executed drill down operations whose data fields correspond to a descending order of hierarchy (e.g., the data value "Office Supplies" corresponds to the data field "Category," which is of a higher hierarchy than the data field "Sub-Category" to which the data value "Art" corresponds).

In some implementations, the data values on the label 608 retain the order of the previous drill down (e.g., "Art, Office Supplies" as illustrated in the label 510 in FIG. 5D) and adds the most recent data value "California" before these two data values. In other words, the label displays the data values "California, Art, Office Supplies" in this order. In some implementations, the label 608 displays the data fields in the order that the drill down was executed, with the data value from the most recently-executed drill operation displayed last (e.g. a label "Office Supplies, Art, California").

Figure 6D:
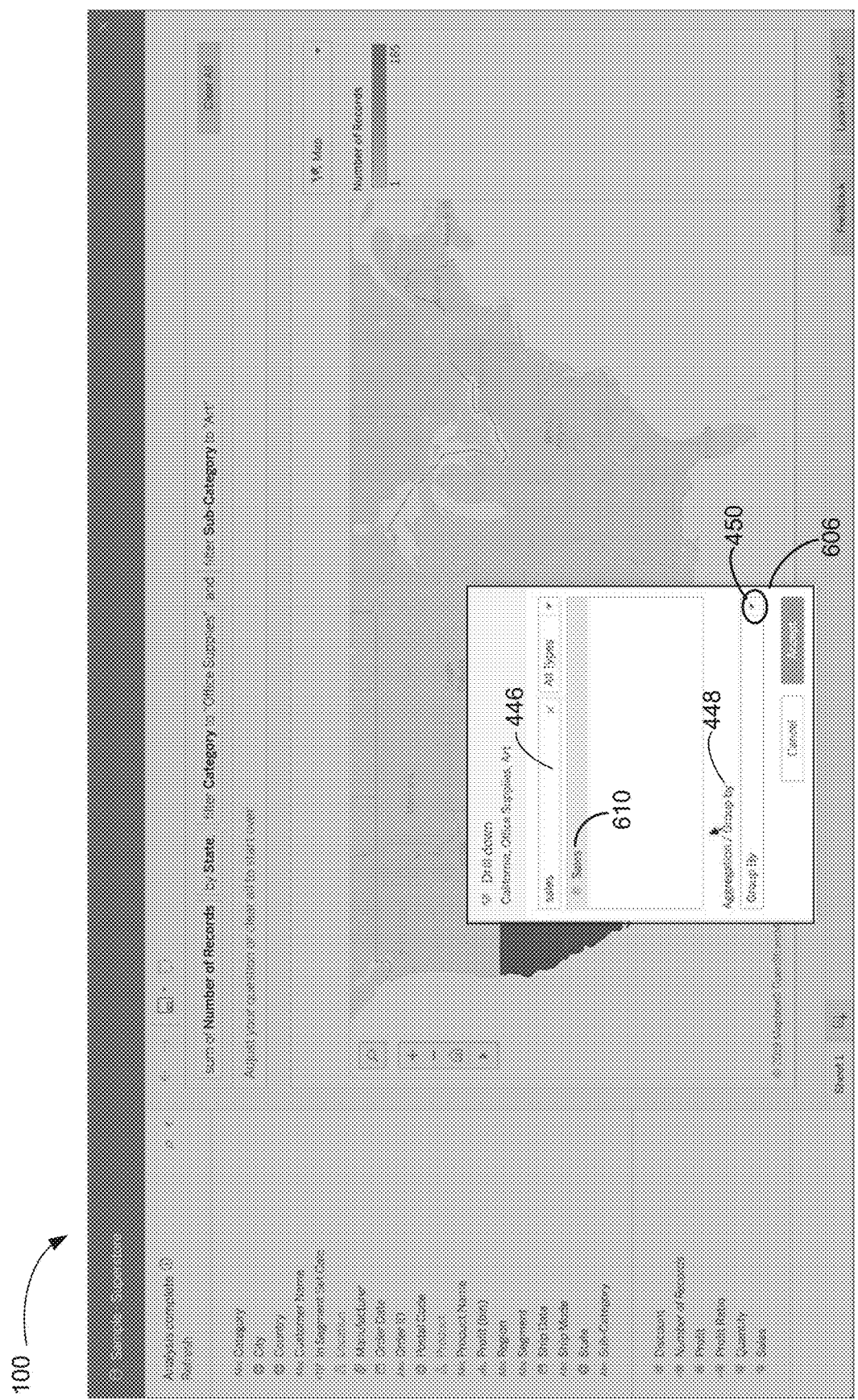

FIG. 6D illustrates user interaction with the drill down widget 606. In this example, the user inputs the word "sales" into the search bar 446. In response to the user input, the data widget 606 displays the data field 610 "Sales." The data widget 606 also displays the "Aggregation/Group by" option 448 and the dropdown button 450.

Figure 6E:

FIG. 6E illustrates user interaction with the dropdown button 450 in FIG. 6D. In some implementations, as illustrated in FIG. 6E, user selection of the dropdown button 450 prompts display of a list 612 of aggregation operators (e.g., "Sum," "Average," "Median," "Count," "Distinct Count," "Cheapest," Minimum," "Most Expensive," and Maximum").

Figure 6F:

FIG. 6F illustrates user selection of the aggregation operator "Sum" from the list 612. This indicates that the user would like a "sum" to be performed on data values of the data field 610 "Sales."

Figure 6G:
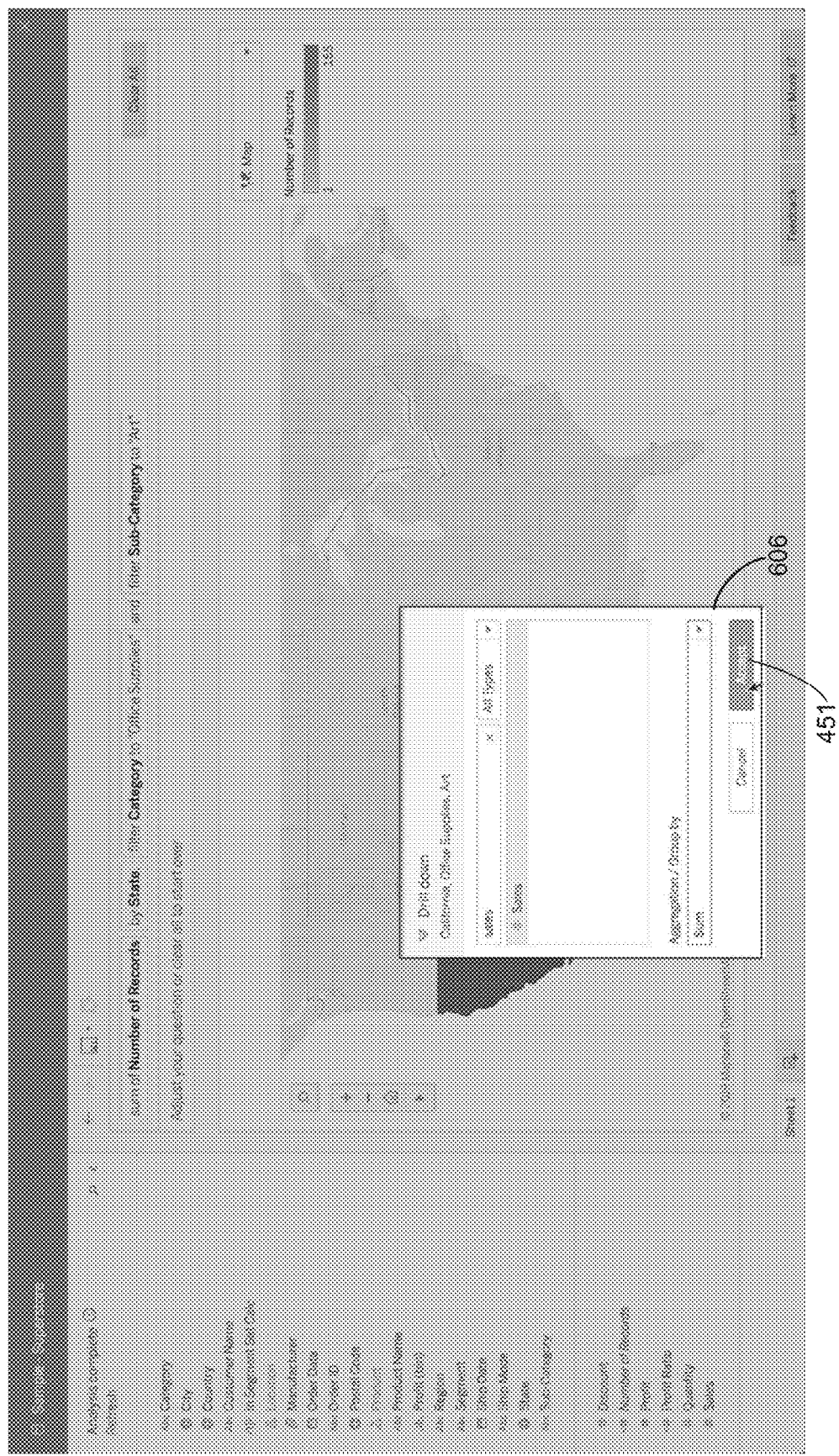

FIG. 6G illustrates user selection of the "Accept" button 451, to further drill down on the sub-category "Art" of the category "Office Supplies," for the state of "California."

Figure 6H:
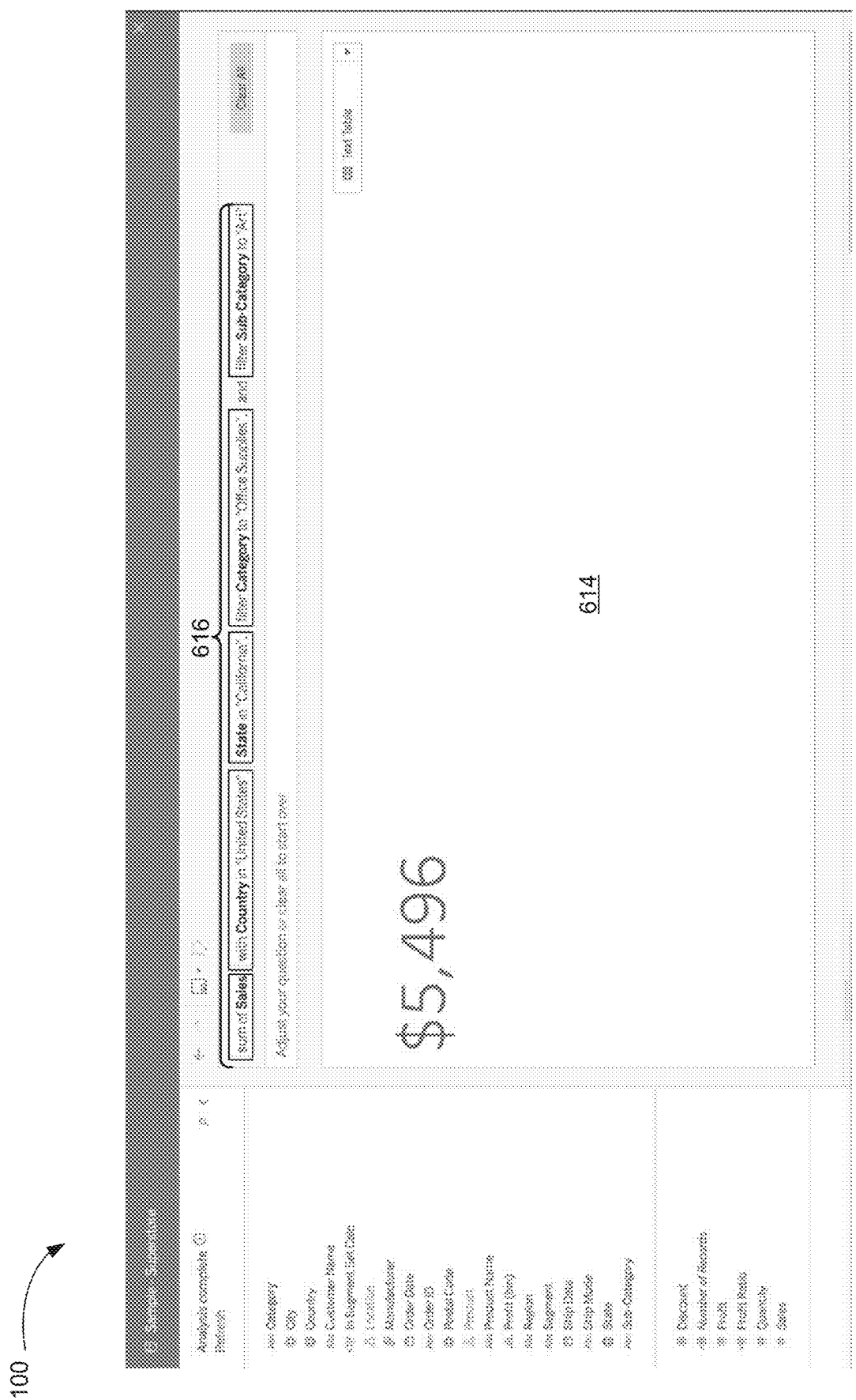
Figure 7A:
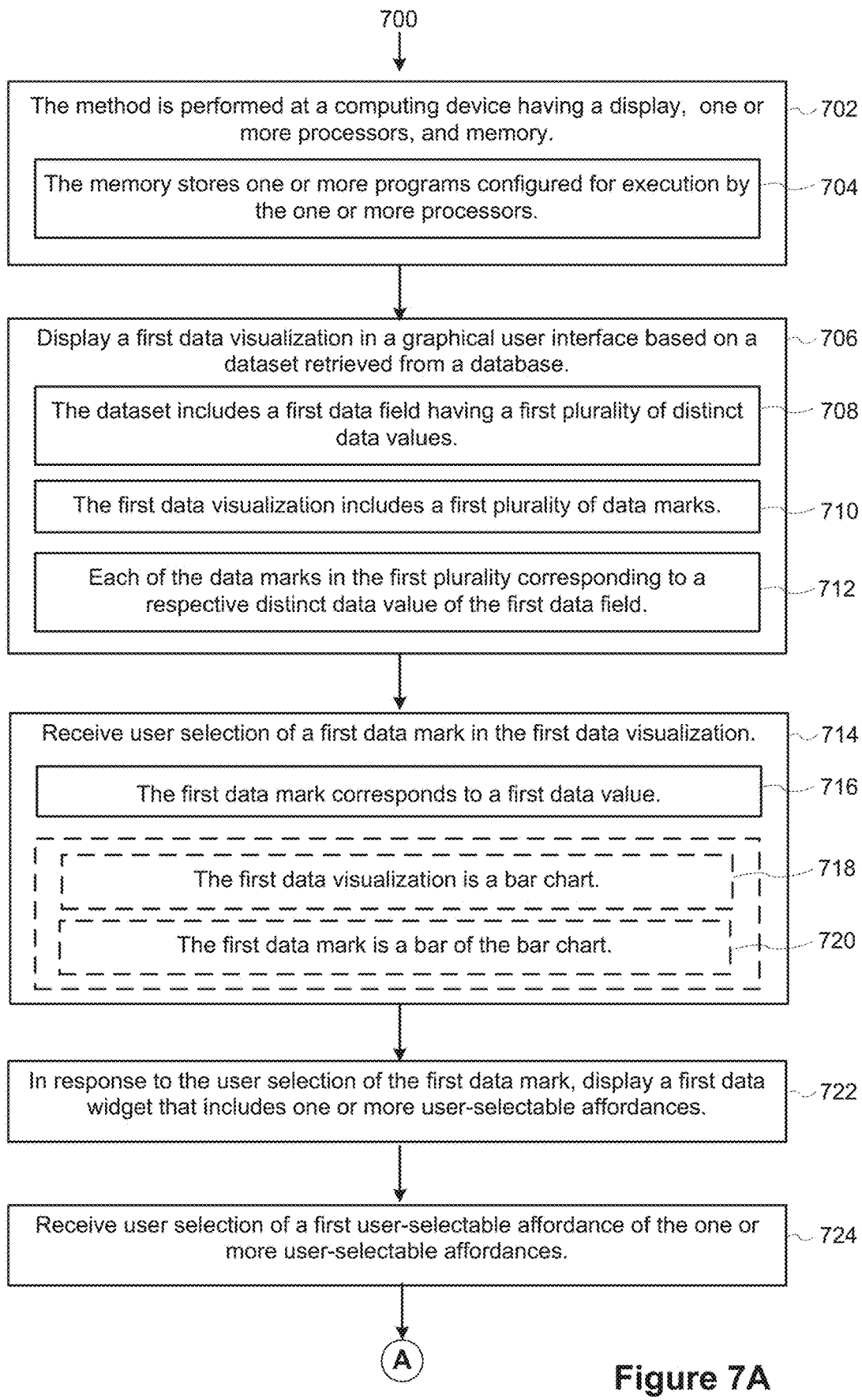
FIGS. 7A-7E provide a flowchart of a method for analyzing data using a data visualization user interface according to some implementations.
Figure 7B:
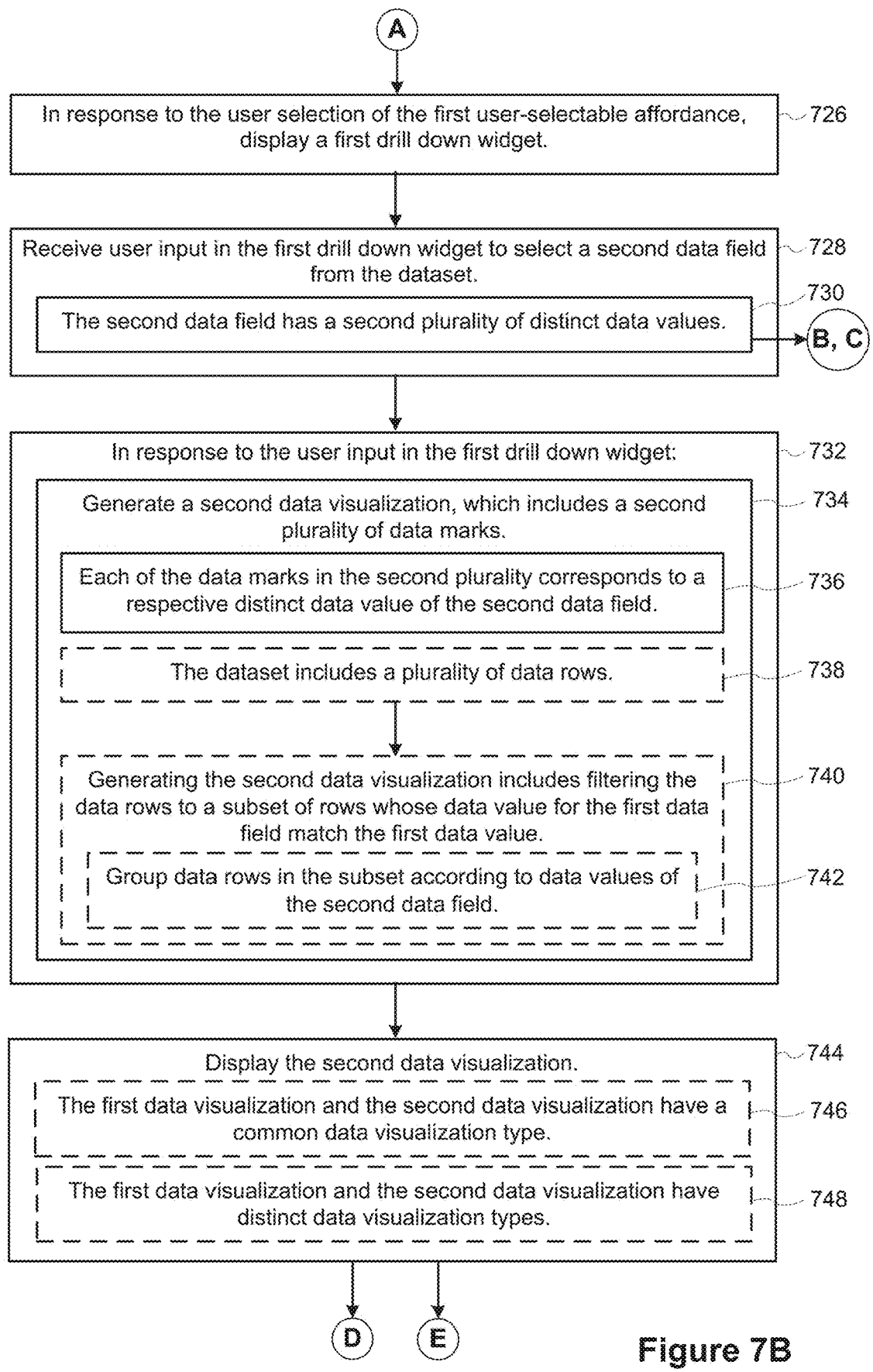
Figure 7C:
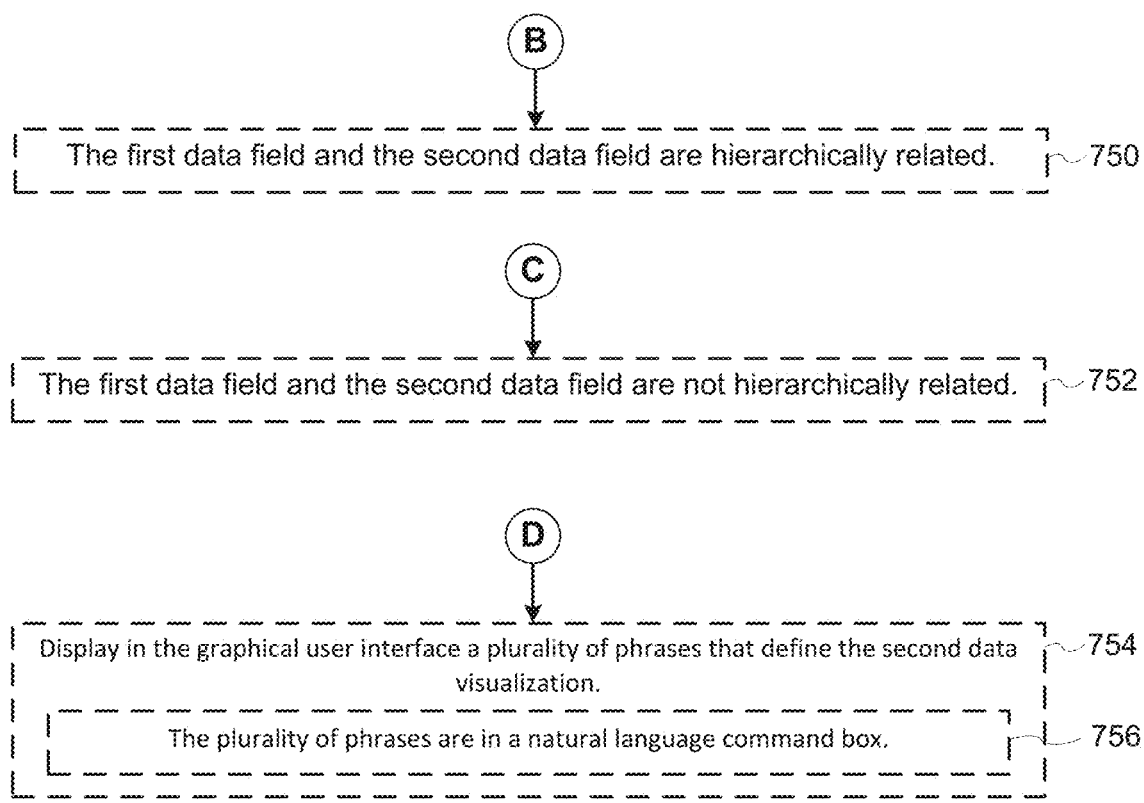
Figure 7D:
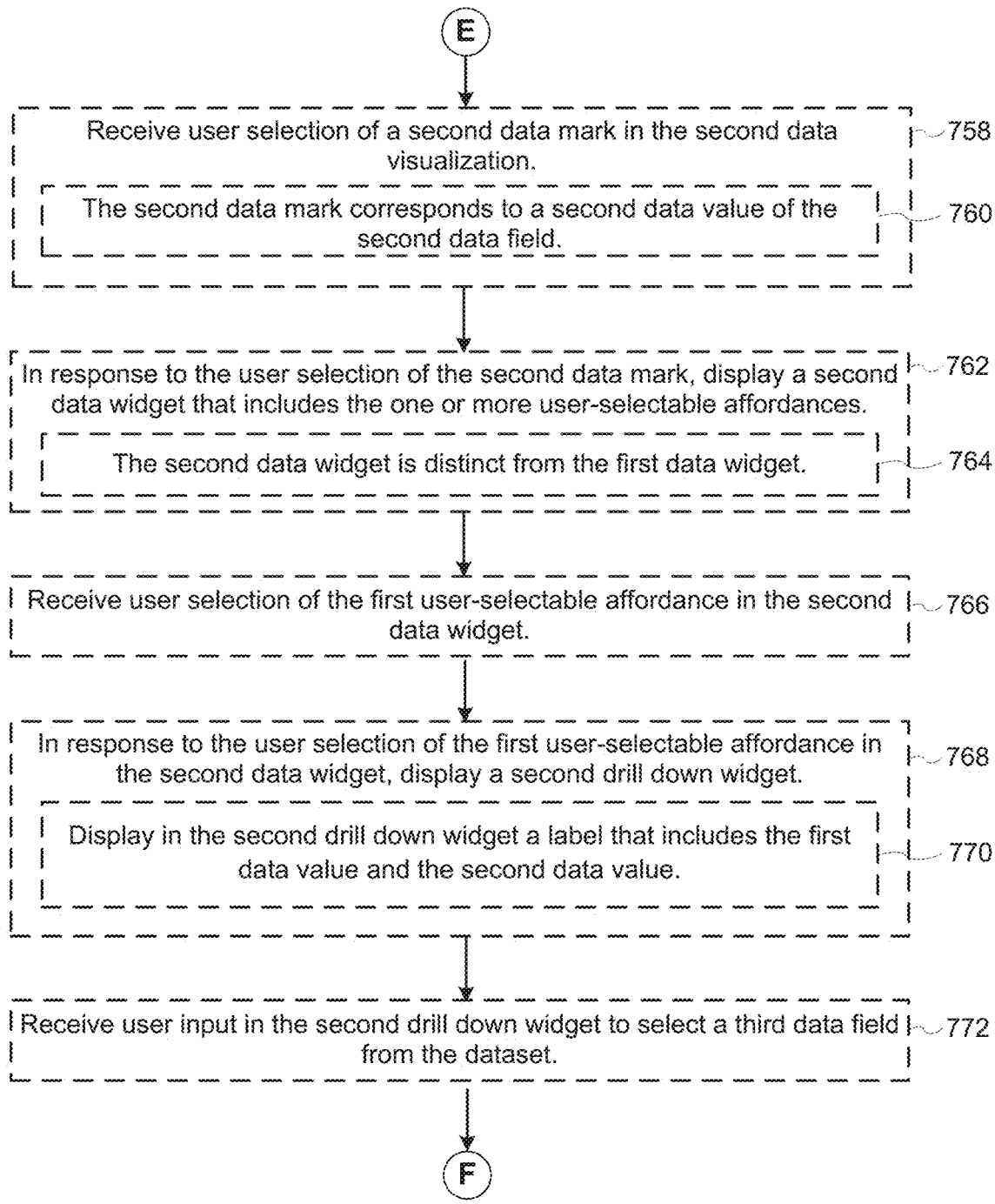
Figure 7E:
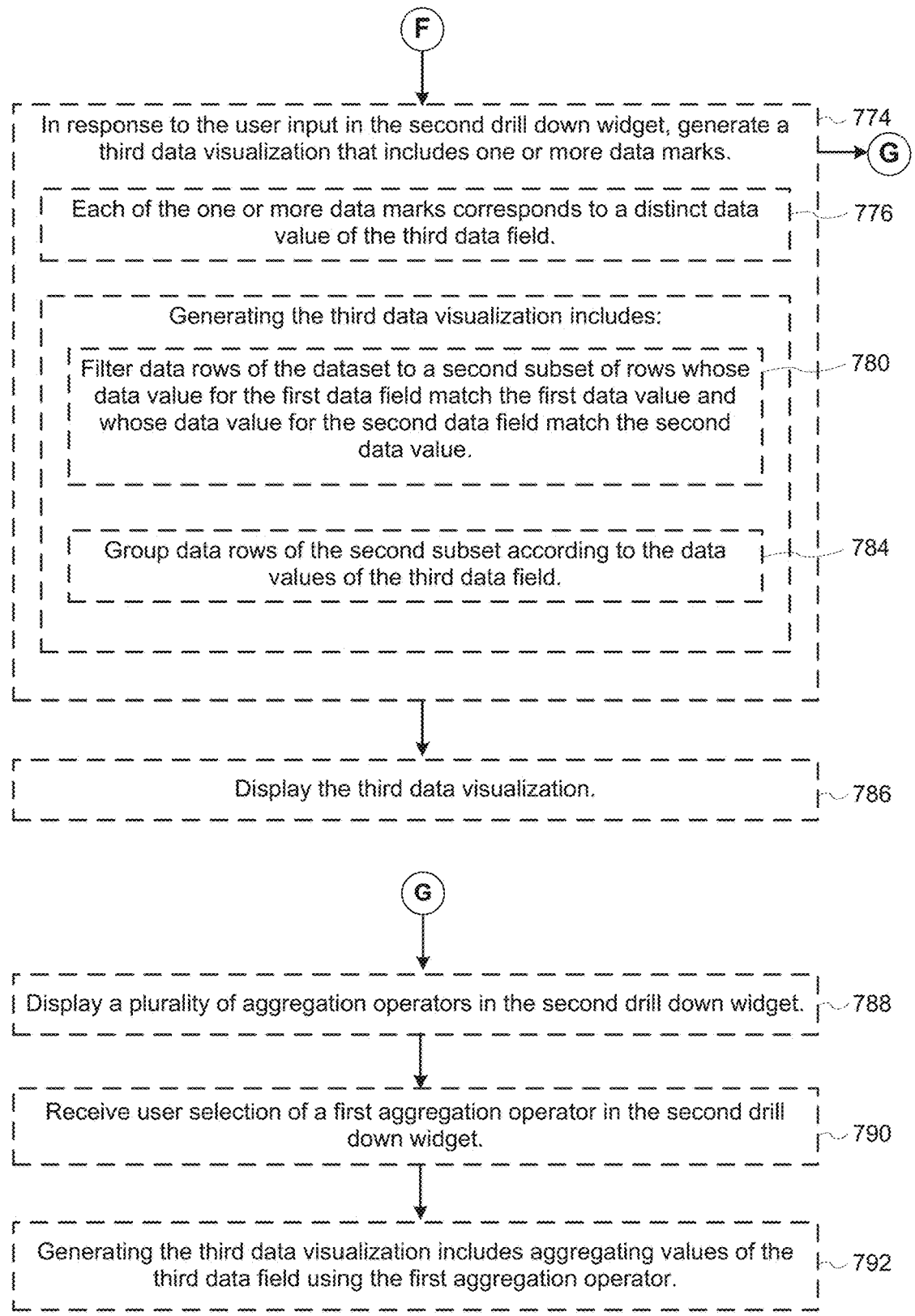

FIG. 6H shows an updated data visualization 614 (e.g., a text table) that is generated and displayed in the graphical user interface 100 in response to user selection of the "Accept" button in FIG. 6G. In this example, all of the rows of data for "Art" in "California" are grouped together to create a single total amount "$5,496" (a text table with a single row and single column) representing the total amount of art being sold in California. A comparison between the phrases 518 (see FIG. 6A) and the phrases 616 shows that the aggregation "sum of Number of Records," which defines the data visualization 514 in FIG. 6A, has been replaced with another aggregation "sum of Sales" to generate the data visualization 614.

FIGS. 7A-7E provide a flowchart of a method 700. The method 700 is also called a process.

The method 700 is performed (702) at a computing device 200 that has a display 212, one or more processors 202, and memory 206. The memory 206 stores (704) one or more programs configured for execution by the one or more processors 202. In some implementations, the operations shown in FIGS. 4A to 6H correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 700 may be combined and/or the order of some operations may be changed.

The computing device 200 displays (706) a first data visualization in a graphical user interface based on a dataset retrieved from a database. The dataset includes (708) a first data field having a first plurality of distinct data values. The first data visualization includes (710) a first plurality of data marks. Each of the data marks in the first plurality corresponds (712) to a respective distinct data value of the first data field.

For example, as illustrated in FIG. 4B, the computing device displays in the graphical user interface 100 a data visualization 408 based on a dataset 300 retrieved from a database 258. The dataset 300 includes a data field "Category" having a plurality of distinct data values "Office Supplies," "Furniture," Garden and Nursery," and "Technology," as illustrated in FIG. 3. The data visualization 408 includes a plurality of data marks 420. Each of the data marks 420 corresponds to a respective distinct data value of the data field "Category." For instance, the data mark 420-1 corresponds to the data value "Office Supplies," the data mark 420-2 corresponds to the data value "Furniture," and the data mark 420-3 corresponds to the data value "Technology."

The computing device 200 receives (714) user selection of a first data mark in the first data visualization. The first data mark corresponds (716) to a first data value. For example, the computing device receives user selection of the data mark 420-1 "Office Supplies" in the first data visualization 408 as illustrated in FIG. 4D. The data mark 420-1 corresponds to the first data value "Office Supplies."

In some implementations, the first data visualization is (718) a bar chart. The first data mark is (720) a bar of the bar chart. This is illustrated in FIG. 4C.

In response to the user selection of the first data mark, the computing device 200 displays (722) a first data widget that includes one or more user-selectable affordances. For example, in FIG. 4D, in response to the user selection of the data mark 420-1, the computing device displays a data widget 424 that includes the user-selectable affordances 430, 432, 434, and 436.

The computing device 200 receives (724) user selection of a first user-selectable affordance of the one or more user-selectable affordances. For example, in FIG. 4E, the computing device receives user selection of the drill down affordance 436.

In response to the user selection of the first user-selectable affordance, the computing device 200 displays (726) a first drill down widget. This is illustrated in FIG. 4F.

The computing device 200 receives (728) user input in the first drill down widget to select a second data field from the dataset. The second data field has (730) a second plurality of distinct data values. For example, in FIG. 4G, the computing device receives user input in the drill down widget 438 to select a data field "Sub-Category" from the dataset 300.

In response to (732) the user input in the first drill down widget, the computing device 200 generates (734) a second data visualization, which includes a second plurality of data marks. Each of the data marks in the second plurality corresponds (736) to a respective distinct data value of the second data field.

For example, as illustrated in FIG. 4I, in response to the user input in the drill down widget 438 to select the data field "Sub-Category," the computing device generates a data visualization 452 that includes a plurality of data marks 454. Each of the data marks 454 in the plurality corresponds to a respective distinct data value of the data field "Sub-Category." In the example of FIG. 4I, the data mark 454-1 corresponds to the data value "Binders" for the data field "Sub-category." Likewise, the data mark 454-3 corresponds to the data value "Storage" for the data field "Sub-category."

In most instances, the dataset includes (738) a plurality of data rows. Generating the second data visualization includes filtering (740) the data rows to a subset of rows whose data value for the first data field match the first data value. For example, referring to FIG. 3, the dataset 300 includes a plurality of data rows, each of the data rows corresponding to an Order number. Generating the data visualization 452 includes filtering the data rows to a subset of rows whose data value for the data field "Category" match the data value "Office Supplies" (e.g., the data rows 302-1, 302-4, 302-5, 302-7, 302-8, 302-9, and 302-12 in FIG. 3).

In some instances, generating the second data visualization includes grouping (742) data rows in the subset according to data values of the second data field. For example, referring to FIG. 3, generating the data visualization 452 includes grouping data rows in the subset (i.e., the data rows having the data value "Office Supplies") according to different sub-categories of the data field "Sub-Category." For instance, the data rows 302-1 and 302-7, which have the same data value "Envelopes" for the field "Sub-Category," are grouped. Similarly, the data rows 302-4 and 302-9 are also grouped because they have the same sub-category "Binders."

The computing device displays (744) the second data visualization. This is illustrated in FIG. 4I.

In some implementations, the first data visualization and the second data visualization have (746) a common data visualization type. For example, the data visualization 408 and the data visualization 452 have a common visualization type (i.e., they are both bar charts).

In some instances, the data visualization type is one of: a bar chart, a Gantt chart, a line chart, a map, a pie chart, a scatter plot, or a tree map.

In some implementations, the first data visualization and the second data visualization have (748) distinct data visualization types. For example, in FIG. 5, the data visualization 452 is a bar chart and the data visualization 514 is a map.

In some implementations, the first data field and the second data field are (750) hierarchically related. For example, the data field "Category" and the data field "Sub-Category" are hierarchically related.

In some implementations, the first data field and the second data field are not (752) hierarchically related. For example, the data field "Sub-Category" and the data field "State" are not hierarchically related. As another example, the data field "Category" and the data field "State" are not hierarchically related.

In some implementations, the method 700 further comprises displaying (754) a plurality of phrases that define the second data visualization, in the graphical user interface 100. For example, in FIG. 4I, the graphical user interface displays the phrases 456 "sum of Number of Records," "by Sub-Category," and "filter Category to 'Office Supplies,'" which define the data visualization 452.

In some implementations, the plurality of phrases are (756) in a natural language command box. For example, in FIG. 4I, the phrases 452 are displayed in a command summary region 412 in a natural language command box 124.

In some implementations, the method 700 further comprises receiving (758) user selection of a second data mark in the second data visualization. The second data mark corresponds (760) to a second data value of the second data field. In response to the user selection of the second data mark, the computing device 200 displays (762) a second data widget that includes the one or more user-selectable affordances. The second data widget is (764) distinct from the first data widget. The computing device 200 receives (766) user selection of the first user-selectable affordances in the second data widget. In response to the user selection of the first user-selectable affordances in the second data widget, the computing device 200 displays (768) a second drill down widget.

For example, as illustrated in FIG. 5C, the computing device receives user selection of the data mark 454-4 in the data visualization 452. The data mark 454-4 corresponds to the data value "Art" for the data field "Sub-Category." In response to the user selection of the data mark 454-4, the computing device displays the data widget 506. The data widget 506 includes the user-selectable affordances 430, 432, 434, and 436. The data widget 506 is distinct from the data widget 428. The computing device receives user selection of the user-selectable affordance 436 in the data widget 506. In response to the user selection of the 436 in the data widget 506, the computing device displays the drill down widget 508.

In some implementations, the computing device 200 displays (770) a label that includes the first data value and the second data value in the second drill down widget. For example, in FIG. 5D, the computing device displays a label 510 that includes the data value "Office Supplies" and the data value "Art" in the drill down widget 508.

In some implementations, the computing device 200 receives (772) a user input in the second drill down widget to select a third data field from the dataset. In response to the user input in the second drill down widget, the computing device 200 generates (774) a third data visualization that includes a third plurality of data marks. Each of the third plurality of data marks corresponds (776) to a distinct data value of the third data field. The computing device further displays (786) the third data visualization.

For example, in FIG. 6D, the computing device receives user input in the drill down widget 606 to select a data field "Sales" from the dataset. As illustrated in FIG. 6H, in response to the user input in the drill down widget 606, the computing device generates a data visualization 614 (e.g., a text table) that includes a single total amount corresponding to the data values of the data field "Sales." The computing device further displays the data visualization 614, as illustrated in FIG. 6H.

In some implementations, generating the third data visualization includes filtering (780) data rows of the dataset to a second subset of rows whose data value for the first data field match the first data value and whose data value for the second data field match the second data value. The computing device groups (784) data rows of the second subset according to the data values of the third data field.

For example, in FIG. 6G, generating the data visualization 514 includes filtering data rows of the dataset 300 to a subset of rows whose data value for the first data field "Category" match the first data value "Office Supplies" and whose data value for the second data field "Sub-Category" match the second data value "Art." The computing device groups data rows from the second subset according to the data values of the third data field "State."

In some implementations, the computing device 200 displays (788) a plurality of aggregation operators in the second drill down widget. The computing device 200 receives (790) user selection of a first aggregation operator in the second drill down widget. Generating the third data visualization includes aggregating (792) values of the third data field using the first aggregation operator.

For example, in FIG. 6E, the computing device displays in the drill down widget 606 a plurality of aggregation operators 612. The computing device receives user selection of the aggregation operator "Sum" in the drill down widget 606, as illustrated in FIG. 6E. Generating the data visualization 614 includes aggregating values of the data field "Sales" using the first aggregation operator "Sum."

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
at a computing device having a display, one or more processors, and memory storing one or more programs configured for execution by the one or more processors:
displaying a first data visualization, in a graphical user interface, based on a dataset retrieved from a database, wherein:
the dataset includes a first data field having a first plurality of distinct data values; and
the first data visualization includes a first plurality of data marks, each of the data marks in the first plurality corresponding to a respective one of the first plurality of distinct data values;
receiving user selection of a first data mark in the first data visualization, the first data mark corresponding to a first distinct data value of the first plurality of distinct data values;
in response to the user selection of the first data mark, displaying a first data widget that includes one or more user-selectable affordances;
receiving user selection of a first user-selectable affordance of the one or more user-selectable affordances;
in response to the user selection of the first user-selectable affordance, displaying a first drill down widget;
receiving a user input in the first drill down widget to select a second data field from the dataset, the second data field having a second plurality of distinct data values;
in response to the user input in the first drill down widget:
generating a second data visualization that includes a second plurality of data marks, each of the data marks in the second plurality corresponding to a respective one of the second plurality of distinct data values; and
displaying the second data visualization.

2. The method of claim 1, wherein the dataset includes a plurality of data rows, and generating the second data visualization includes filtering the data rows to a first subset of rows whose data value for the first data field match the first data value.

3. The method of claim 2, wherein generating the second data visualization includes grouping data rows in the subset according to data values of the second data field.

4. The method of claim 1, wherein the first data field and the second data field are hierarchically related.

5. The method of claim 1, wherein the first data field and the second data field are not hierarchically related.

6. The method of claim 1, further comprising displaying, in the graphical user interface, a plurality of phrases that define the second data visualization.

7. The method of claim 6, wherein the plurality of phrases are in a natural language command box.

8. The method of claim 1, further comprising:
receiving user selection of a second data mark in the second data visualization, the second data mark corresponding to a second data value of the second data field;
in response to the user selection of the second data mark, displaying a second data widget that includes the one or more user-selectable affordances, wherein the second data widget is distinct from the first data widget;
receiving user selection of the first user-selectable affordances in the second data widget;
in response to the user selection of the first user-selectable affordances in the second data widget, displaying a second drill down widget;
receiving a user input in the second drill down widget to select a third data field from the dataset;
in response to the user input in the second drill down widget:
generating a third data visualization that includes a third plurality of data marks, each of the third plurality of data marks corresponding to a distinct data value of the third data field; and
displaying the third data visualization.

9. The method of claim 8, wherein generating the third data visualization includes:
   filtering data rows of the dataset to a second subset of rows whose data value for the first data field match the first data value and whose data value for the second data field match the second data value; and
   grouping data rows of the second subset according to the data values of the third data field.

10. The method of claim 8, further comprising displaying, in the second drill down widget, a label that includes the first data value and the second data value.

11. The method of claim 8, further comprising:
   displaying, in the second drill down widget, a plurality of aggregation operators; and
   receiving user selection of a first aggregation operator in the second drill down widget;
   wherein generating the third data visualization includes aggregating values of the third data field using the first aggregation operator.

12. The method of claim 1, wherein the first data visualization is a bar chart, and the first data mark is a bar of the bar chart.

13. The method of claim 1, wherein the first data visualization and the second data visualization have a common data visualization type.

14. The method of claim 1, wherein the first data visualization and the second data visualization have distinct data visualization types.

15. A computing device comprising:
   one or more processors;
   memory coupled to the one or more processors;
   a display; and
   one or more programs stored in the memory and configured for execution by the one or more processors, the one or more programs comprising instructions for:
      displaying a first data visualization, in a graphical user interface, based on a dataset retrieved from a database, wherein:
         the dataset includes a first data field having a first plurality of distinct data values; and
         the first data visualization includes a first plurality of data marks, each of the data marks in the first plurality corresponding to a respective one of the first plurality of distinct data values of the first data field;
      receiving user selection of a first data mark in the first data visualization, the first data mark corresponding to a first distinct data value of the first plurality of distinct data values;
      in response to the user selection of the first data mark, displaying a first data widget that includes one or more user-selectable affordances;
      receiving user selection of a first user-selectable affordance of the one or more user-selectable affordances;
      in response to the user selection of the first user-selectable affordance, displaying a first drill down widget;
      receiving a user input in the first drill down widget to select a second data field from the dataset, the second data field having a second plurality of distinct data values;
      in response to the user input in the first drill down widget:
         generating a second data visualization that includes a second plurality of data marks, each of the data marks in the second plurality corresponding to a respective one of the second plurality of distinct data values of the second data field; and
         displaying the second data visualization.

16. The computing device of claim 15, wherein the dataset includes a plurality of data rows, and the instructions for generating the second data visualization includes instructions for filtering the data rows to a subset of rows whose data value for the first data field match the first data value.

17. The computing device of claim 16, wherein the instructions for generating the second data visualization includes instructions for grouping data rows in the subset according to data values of the second data field.

18. The computing device of claim 15, further comprising instructions for displaying, in the graphical user interface, a plurality of phrases that define the second data visualization.

19. The computing device of claim 18, wherein the plurality of phrases are in a natural language command box.

20. A non-transitory computer readable storage medium storing one or more programs, the one or more programs comprising instructions, which when executed by a computing device, cause the device to perform the method of:
   displaying a first data visualization, in a graphical user interface, based on a dataset retrieved from a database, wherein:
      the dataset includes a first data field having a first plurality of distinct data values; and
      the first data visualization includes a first plurality of data marks, each of the data marks in the first plurality corresponding to a respective one of the first plurality of distinct data values of the first data field;
   receiving user selection of a first data mark in the first data visualization, the first data mark corresponding to a first distinct data value of the first plurality of distinct data values;
   in response to the user selection of the first data mark, displaying a first data widget that includes one or more user-selectable affordances;
   receiving user selection of a first user-selectable affordance of the one or more user-selectable affordances;
   in response to the user selection of the first user-selectable affordance, displaying a first drill down widget;
   receiving a user input in the first drill down widget to select a second data field from the dataset, the second data field having a second plurality of distinct data values;
   in response to the user input in the first drill down widget:
      generating a second data visualization that includes a second plurality of data marks, each of the data marks in the second plurality corresponding to a respective one of the second plurality of distinct data values of the second data field; and
      displaying the second data visualization.

* * * * *